US010632971B2

(12) United States Patent
Cassady et al.

(10) Patent No.: US 10,632,971 B2
(45) Date of Patent: Apr. 28, 2020

(54) GROMMET INSTALLER

(71) Applicant: City Pattern and Foundry, Granger, IN (US)

(72) Inventors: Connor Cassady, South Bend, IN (US); Kevin Gearhart, Granger, IN (US)

(*) Notice: Subject to any disclaimer, the term of this patent is extended or adjusted under 35 U.S.C. 154(b) by 148 days.

(21) Appl. No.: 15/799,884

(22) Filed: Oct. 31, 2017

(65) Prior Publication Data

US 2018/0118167 A1 May 3, 2018

Related U.S. Application Data

(60) Provisional application No. 62/414,933, filed on Oct. 31, 2016.

(51) Int. Cl.
*B60S 1/04* (2006.01)
*B23P 19/04* (2006.01)
(Continued)

(52) U.S. Cl.
CPC ............ *B60S 1/0444* (2013.01); *B23P 19/04* (2013.01); *B23P 19/084* (2013.01); *B23P 19/12* (2013.01); *B25J 9/1697* (2013.01); *B60S 1/0441* (2013.01); *B60S 1/0447* (2013.01); *B60S 1/043* (2013.01); *B60S 1/0469* (2013.01); *B60S 1/349* (2013.01); *B60S 1/583* (2013.01); *Y10T 29/4978* (2015.01); *Y10T 29/49769* (2015.01); *Y10T 29/49778* (2015.01); *Y10T 29/49872* (2015.01)

(58) Field of Classification Search
CPC ......... Y10T 29/49872; Y10T 29/49769; Y10T 29/49778; Y10T 29/4978; B23P 19/04; B23P 19/084; B23P 19/12; B60S 1/043; B60S 1/0441; B60S 1/0444; B60S 1/0447; B60S 1/0469; B25J 9/1697; B25J 9/1687; B25J 15/0004; B25J 15/08; B25J 15/10; B25J 15/0028; B25J 15/0047
See application file for complete search history.

(56) References Cited

U.S. PATENT DOCUMENTS 4,114,509 A 9/1978 Poe
5,432,996 A 7/1995 Imgrut
(Continued)

*Primary Examiner* — Jermie E Cozart
(74) *Attorney, Agent, or Firm* — Notre Dame Intellectual Property Clinic

(57) ABSTRACT

An automated grommet installer and methods of installing a grommet. The installer and methods are capable of seating a grommet in an aperture of a window and facilitating correct alignment of the grommet within the window. Grommets are used to support and seal around a window wiper attached to a window. Typically, grommets are asymmetrical to match the curvature of the window. Embodiments of the described installer maintain grommet orientation while inserting the grommet in the window, quickly and efficiently installing the grommet. In embodiments the installer includes a system for identifying an incorrectly loaded grommet prior to installation and alerting an operator. In other embodiments, the installer includes a positioner that positions the grommet proximate to the window for installation and a gripper having one or more fingers reach through the window aperture, engage the grommet, and draw it into position, seated in the window.

20 Claims, 22 Drawing Sheets

(51) Int. Cl.

| | |
|---|---|
| *B25J 9/16* | (2006.01) |
| *B25J 15/08* | (2006.01) |
| *B23P 19/12* | (2006.01) |
| *B25J 15/10* | (2006.01) |
| *B25J 15/00* | (2006.01) |
| *B23P 19/08* | (2006.01) |
| *B60S 1/58* | (2006.01) |
| *B60S 1/34* | (2006.01) |

(56) References Cited

U.S. PATENT DOCUMENTS

| | | | |
|---|---|---|---|
| 5,562,375 A | | 10/1996 | Jackson |
| 9,656,391 B2* | | 5/2017 | Kossmann ............. B25J 9/1687 |
| 2006/0107510 A1* | | 5/2006 | Mondrusov ............. B23P 19/04 |
| | | | 29/407.1 |
| 2011/0182708 A1* | | 7/2011 | Baudisch ............. B25J 15/0019 |
| | | | 414/737 |
| 2011/0209320 A1* | | 9/2011 | Connolly ............. B23P 19/084 |
| | | | 29/407.04 |

* cited by examiner

GROMMET INSTALLER

CROSS-REFERENCES AND PRIORITY CLAIMS

This application claims priority to "Window Wiper Grommet Installer" Provisional Application No. 62/414,933 filed on Oct. 31, 2016 and incorporated herein by reference.

BACKGROUND

In many automobile models a rear window wiper is attached to or through the rear window itself, rather than the door or panel below. In some models this allows the window with the wiper to move independently from the door or panel below and the window can be opened without opening the whole of the rear door. In general a window wiper assembly includes a blade mounted on the exterior of the window that clears the window, a motor located in the interior of the vehicle or in the vehicle panels that drives the wiper blade, and an arm or connector that connects the motor to the blade. The window includes a pre-drilled aperture and the connector or part of the connector is inserted through the aperture. A window wiper a grommet is installed in the window aperture, forms a seal around the connector and prevents liquids from entering the vehicle through the window aperture.

The grommet is formed from an elastic material that deforms to allow the grommet to be inserted into the aperture in the window then return to its unstressed shape to seat firmly within the aperture. The grommet has a channel around the circumference of the exterior of the grommet that holds grommet in position in the window aperture. The glass of the window fills the channel, with the walls of the channel holding the grommet seated in the aperture. Typically, the grommet includes a hole through the core of the grommet and the connector is inserted through the hole to connect the exterior wiper blade and the interior motor. Since vehicles windows are often curved, the grommet can be asymmetrical in shape to match the curve of the window.

Once the window wiper is installed, the grommet serves as a waterproof or water resistant barrier between the outside environment and the inside of the automobile. It also serves to hold the window wiper assembly firmly in place. Because of the curve in the window, the grommet is curved to fit firmly against the window. A misaligned grommet will not form a seal with the window. For at least these reasons, it is important that the grommet is properly aligned with the window when it is inserted into the window aperture.

In some instances, the grommet is pulled into place in the window solely by hand. In other instances an assembler uses a plunger tool, threaded through the grommet and the aperture. The assembling employee pulls the thread manually until the grommet is seated within the aperture. Both methods can be slow and result in inaccurate alignment of the grommet within the window.

In the assembly of automobile windows, many components need to be added to the window including stickers, heating coils, and window wipers. Often, many of the additional components are installed by a window assembly machine, which holds the windows and installs the various components. Currently, however, some components are added manually; for example, the windshield wiper assembly.

SUMMARY

The following presents a simplified summary in order to provide a basic understanding of some aspects of the claimed subject matter. This summary is not an extensive overview. It is not intended to either identify key or critical elements or to delineate the scope of the claimed subject matter. Its sole purpose is to present some concepts in a simplified form as a prelude to the more detailed description that is presented later.

In embodiments, a grommet installer is directed to a device that satisfies the need for a faster and more accurate way to install grommets into the window aperture. In an embodiment, the installer is a device for installing a grommet in a window aperture, the device comprising a holder configured to support the grommet, a positioner arm that supports the holder and is configured to move the grommet into position for installation in the window aperture, a gripper configured to extend through the window aperture, engage the grommet in the grommet holder and retract to pull the grommet from the grommet holder into the window aperture, and a controller programmed to direct movement of the positioner arm and the gripper. The gripper can include one or more fingers configured to insert through the window aperture and a hole in the grommet, wherein the fingers expand radially to engage the grommet. The device can also include a vision system that monitors grommet orientation on the holder.

In embodiments, methods for installing a grommet in an aperture are described. In an embodiment, a method for installing a grommet in a window aperture, the method comprising providing a grommet installer having a positioner configured to support the grommet and a gripper having fingers configured to draw the grommet into the window aperture. Steps include loading the grommet on a holder supported by the positioner, the holder positioned on a first side of the window aperture, orienting the grommet on the holder for installation in the window aperture, moving the positioner to position the holder and grommet proximate to the window aperture, inserting fingers through the window aperture to engage the grommet; retracting the gripper to pull the fingers and the grommet through the aperture so that the grommet is installed within the aperture; and disengaging the fingers from the installed grommet. Other embodiments of the method include monitoring grommet alignment with a vision system and smoothing the grommet after installing the grommet in the window aperture.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

The systems, devices and methods may be better understood by referring to the following description in conjunction with the accompanying drawings, in which like numerals indicate like structural elements and features in various figures. The components in the figures are not necessarily to scale, and simply illustrate the principles of the systems, devices and methods. The accompanying drawings illustrate only possible embodiments of the systems, devices and methods and are therefore not to be considered limiting in scope.

DETAILED DESCRIPTION

Aspects of the system and methods are described below with reference to illustrative embodiments. The references to illustrative embodiments below are not made to limit the scope of the claimed subject matter. Instead, illustrative embodiments are used to aid in the description of various aspects of the systems and methods. The description, made by way of example and reference to illustrative reference is not meant to being limiting as regards any aspect of the claimed subject matter.

Figure 1A:
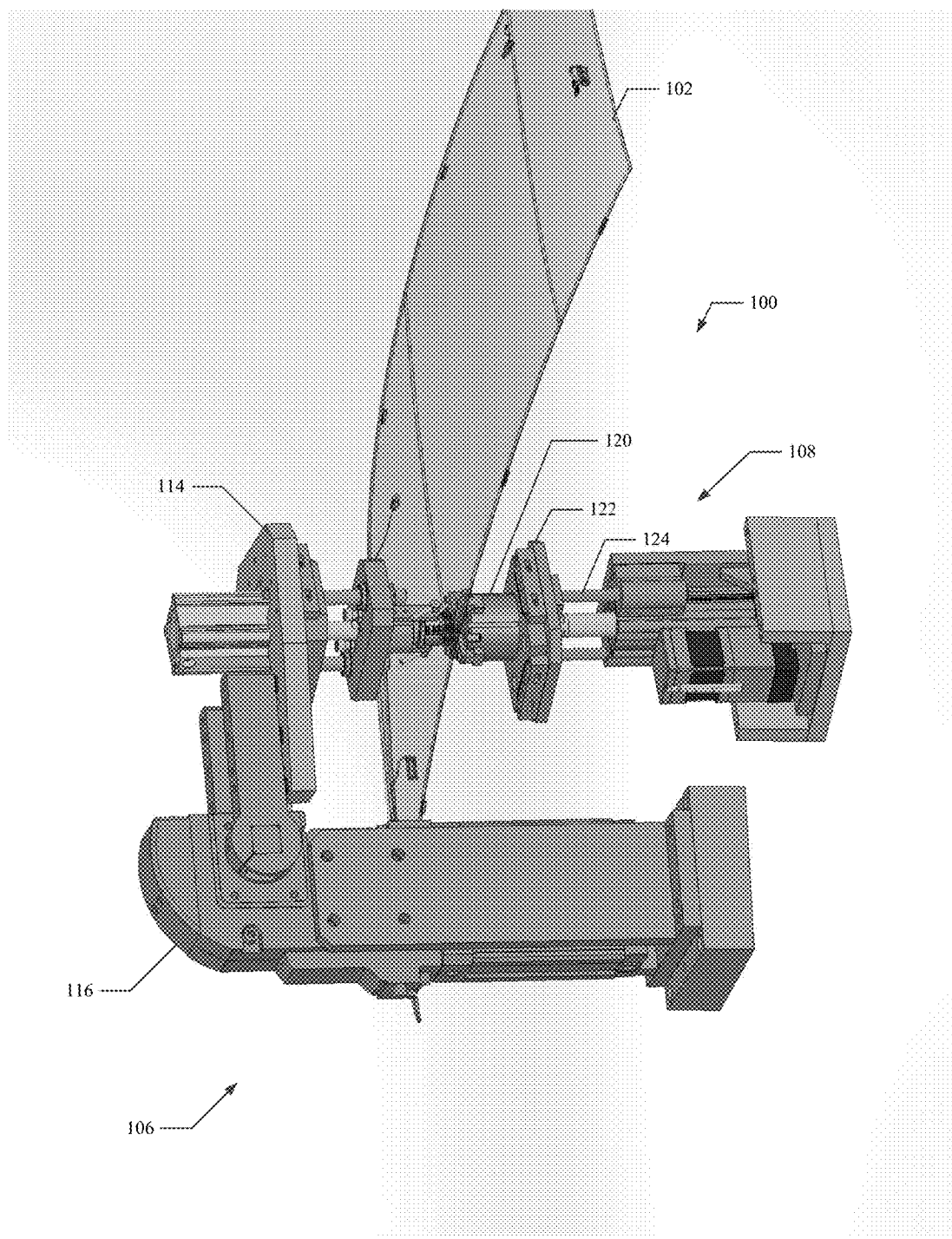
FIG. 1A depicts an embodiment of a grommet installer with a window.
Figure 1B:
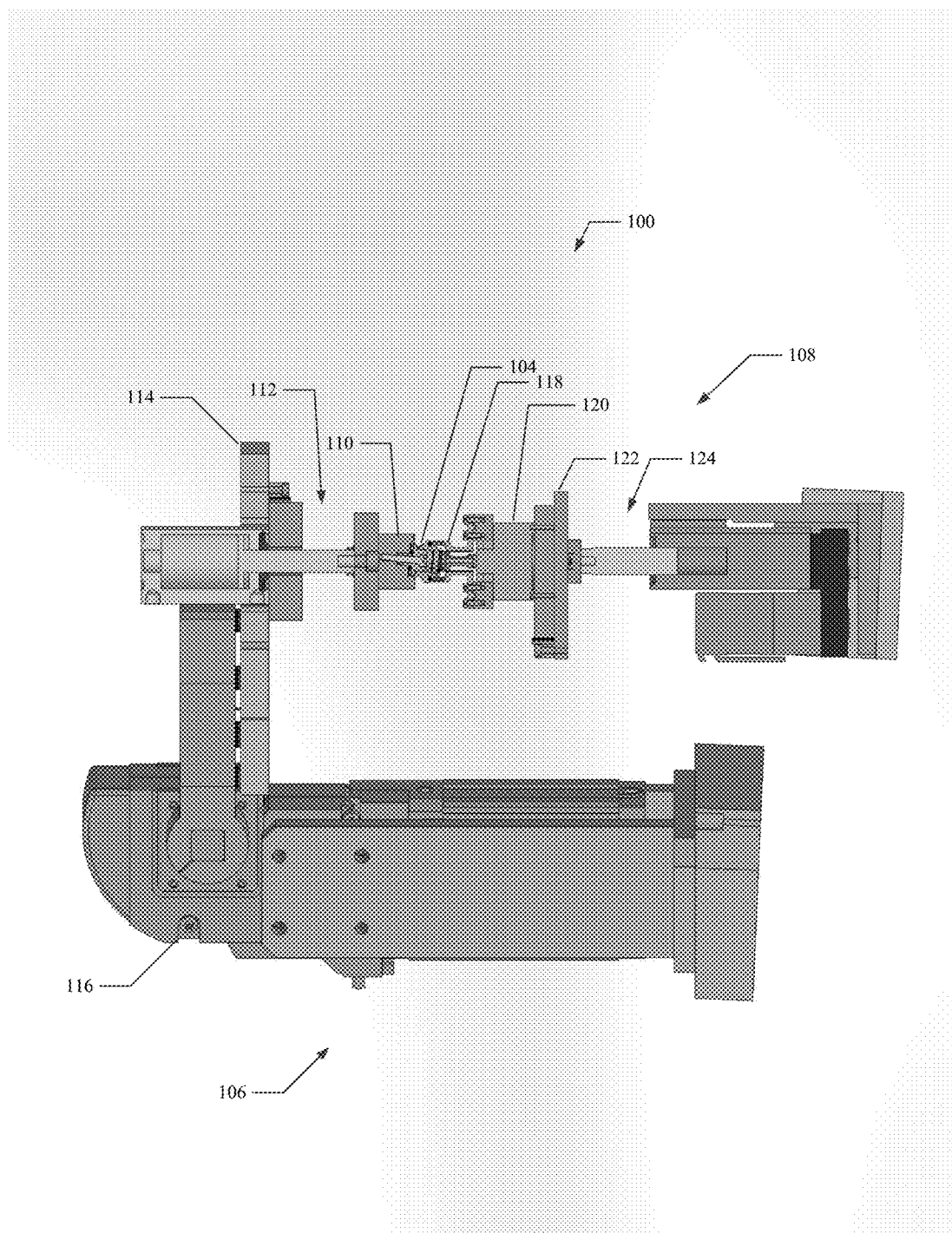
FIG. 1B depicts an embodiment of a grommet installer

FIGS. 1A and 1B depict a grommet installer 100 that is capable of automatically installing a grommet 104 within a window 102. The illustrated grommet installer 100, also referred to herein as the installer 100, ensures that the grommet 104 is correctly oriented and installed within an aperture of a window. The grommet installer 100 is both quicker and more accurate than hand installation by an individual. The grommet installer 100 can be used with or attached to a window assembly machine (not shown) that installs defroster wiring and other features on a window 102.

Many vehicles include a wiper for the rear window. In particular, sports utility vehicles (SUVs) and other square backed vehicles often include a rear wiper due in part to the spray that is kicked up by vehicle tires. In many automobile models, the rear window wiper is attached or connected to the rear window rather than the door or panel below the window. In some models, this allows the window with the attached wiper to move independently from the door or panel.

A window assembly can include a window 102 with a pre-drilled aperture, a grommet 104 that is pulled partway through the window 102 and seated within the pre-drilled aperture, and a window wiper assembly that attaches to, or is inserted through the grommet 104. Typically, the grommet 104 is formed from an elastic material that deforms or compresses to allow the grommet 104 to be inserted into the aperture in the window 102 then returns to its unstressed shape to seat firmly within the window aperture. The grommet 104 can include a channel or groove 200 on its the circumference, approximately around the middle of the grommet 104. The walls of the grommet 104 on either side of the channel 200 keep the grommet 104 in place after the grommet 104 is installed in the window 102, with the window glass held in the channel 200. As with a typical grommet 104, there is a hole 202 running through its core.

Traditionally, in automobile assembly, the window wiper grommet has been installed manually. In some instances, the grommet is pulled through the aperture in the window solely by hand. In other instances an installing employee uses a plunger tool to grip the grommet and pull it part way through the aperture in the window 102.

Turning again to FIGS. 1A and 1B, an embodiment of the grommet installer 100 is depicted, including a positioner 106 that positions the grommet 104 adjacent to the window 102 in which the grommet 104 is to be installed, and a gripper 108 that engages the grommet 104 and pulls a portion of the grommet 104 through the window aperture, leaving the grommet 104 seated in the aperture. In embodiments, the grommet installer 100 is attached to, or a part of, a larger window assembly machine that holds the window 102 and installs various required items onto the window 102 (e.g., stickers, wiring for a defrosting system, or other components).

In embodiments, the positioner 106 and gripper 108 are located, at least in part, on opposite sides of the window 102. The positioner 106 holds the grommet 104 proximate to the window 102 in the desired orientation during installation. The grommet can be oriented in the positioner so that when it is installed in the window, the contours of the grommet match the curve of the window. The gripper 108 reaches through the aperture in the window 102, engages the grommet 104, and pulls the grommet into position in the window aperture.

In embodiments, the positioner 106 includes a holder 110 that supports the grommet 104 during installation, maintaining the orientation of the grommet 104 relative to the window 102. In the illustrated embodiment, the holder 110 is supported by a holder base 112, which can be extended or retracted to adjust for the geometry of the window. For example, the length of the holder base 112 can be shortened to position the grommet 104 for a thick window 102, or lengthened when the installer 100 is used to install a grommet 104 in a thinner window. The length adjustment allows the grommet to be positioned adjacent to, or abutting the window without damaging or cracking the window. In additional embodiments, the holder base 112 is connected to a positioner platform 114 and can be adjusted laterally relative to the positioner platform 114. This lateral adjustment of the holder base 112 and holder 106 allows for different locations of the aperture in the window 102. These longitudinal and lateral adjustments ensure that the installer 100 is customizable for multiple types and sizes of windows and grommets.

In an embodiment, the positioner platform 114 is connected to a positioner arm 116 that is capable or rotating, pivoting, or otherwise moving to move the holder 110 from a loading position, suitable for loading the grommet 104 into the holder 110, to an installation position, proximate to the window 102 and ready for the gripper 108 to grasp the grommet 104 and pull it into the window aperture. FIGS. 1A and 1B depict the positioner 106 and positioner arm 116 in the installation position, with the holder 106 close to the window and gripper. However, the positioner arm 116, or a portion of the positioner arm 116, can move away from the window 102 making it easier for an operator to load a grommet into or on the holder 106. As discussed in further detail below, the installer 100 can include a user interface, controller and actuators to automate the installation process. In some embodiments, the operator need only load the grommet 104 in the installer 100 and push a control to install the grommet.

In embodiments, the gripper 108 includes one or more fingers 118 that insert through the aperture of the window 102 to engage the grommet 104. The fingers 118 grasp the grommet 104 and pull it toward the window 102, drawing a portion of the grommet 104 through the aperture and installing the grommet 104. The fingers 118 are attached to a gripper base 120 that is capable of moving the fingers 118 engage the grommet 104 and then to release the grommet 104 once it is in position, seated in the window aperture. As discussed in more detail below, in embodiments, the gripper base 120 can move the fingers laterally, effectively expanding and contracting the grip of the fingers 118. In another embodiment, the gripper base 120 can rotate the fingers 118, which can be used smooth the grommet 104 once it is in place in the window aperture and remove any deformation or wrinkling of the grommet 104 caused by grasping and drawing the grommet 104 through the window aperture.

In embodiments, the gripper base 120 is connected to a gripper platform 122. As with the positioner platform 114, lateral adjustments of the gripper base 120 relative to the gripper platform 122 allow the gripper 108 to be customized for a particular window and window aperture geometry. The gripper platform 122 is connected to a gripper arm 124 that can extend and retract the gripper 108, extending to move the fingers 118 through the window aperture, and retracting to draw the grommet 104 into the aperture.

Figure 2A:
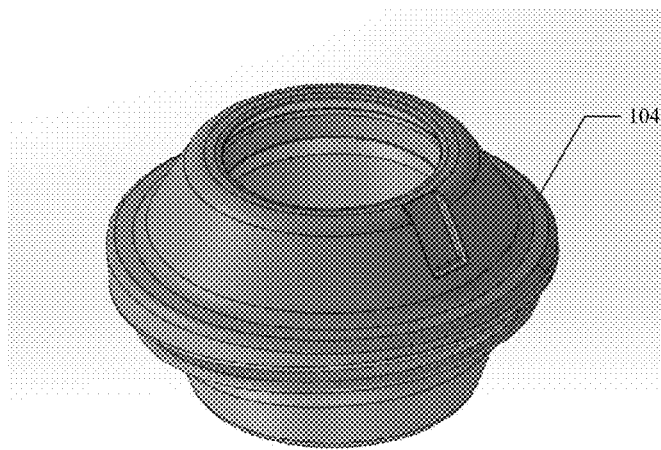
FIG. 2A is a perspective view of a grommet.
Figure 2C:
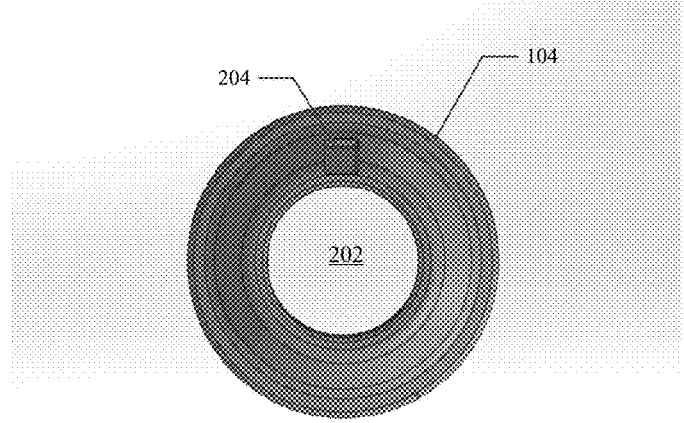
FIG. 2C is a top view of a grommet.
Figure 2B:
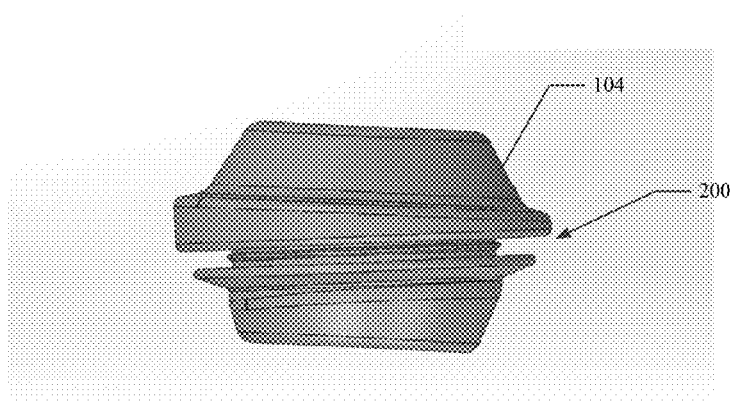
FIG. 2B is a side view of a grommet.
Figure 2D:
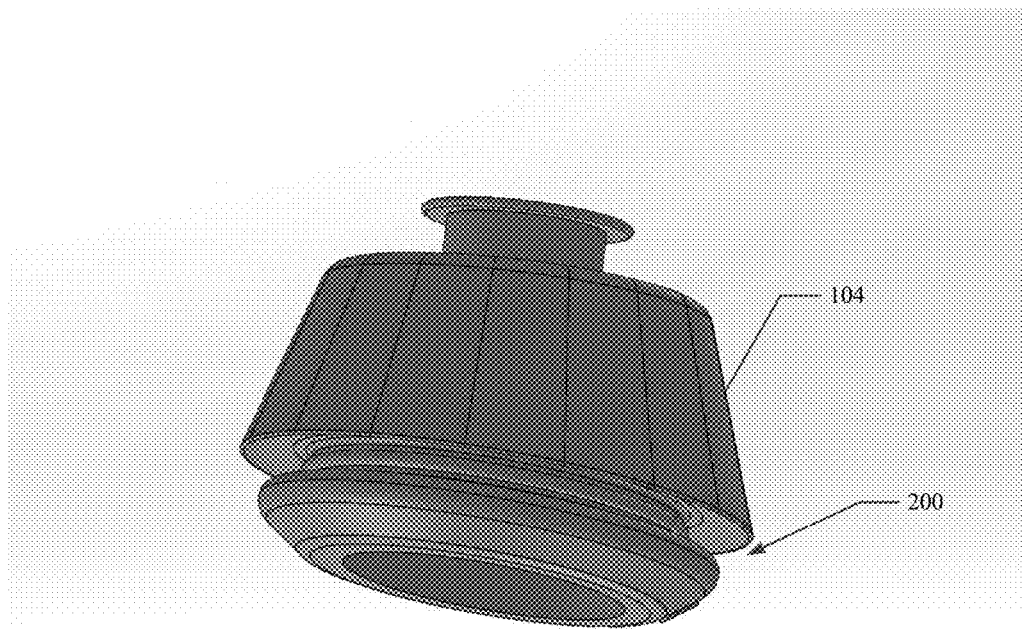
FIG. 2D is a perspective view of another grommet.
Figure 2E:
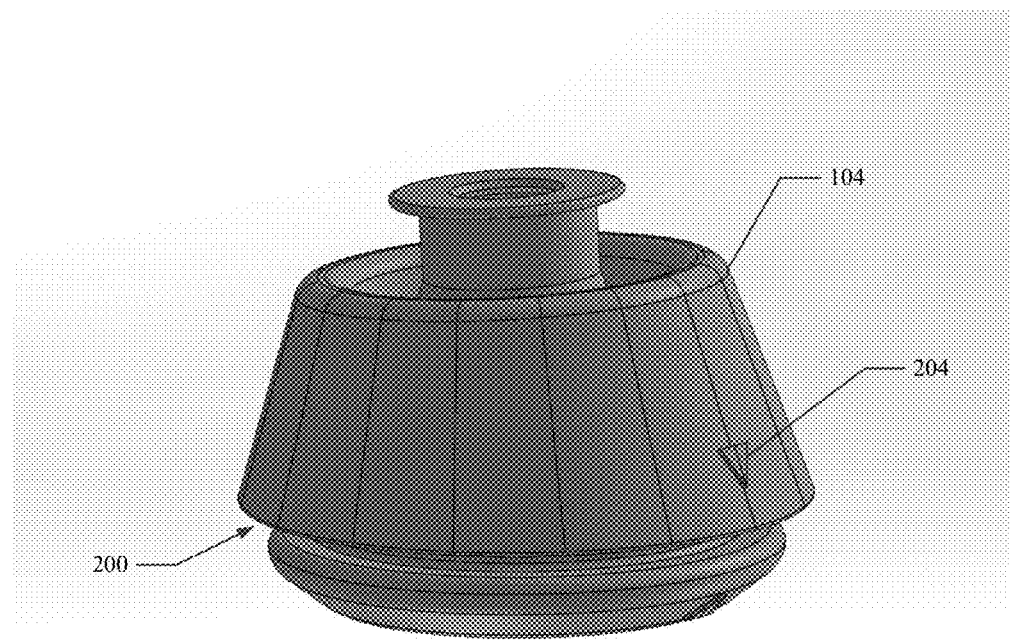
FIG. 2E is a side view of another grommet.

FIGS. 2A-2C illustrate an embodiment of a grommet 104 and FIGS. 2D-2E illustrate another embodiment of the grommet 104. Grommets are typically formed from rubber or an elastic material and include a hole 202 through the main body of the grommet 104 and a groove or channel 200 around the exterior of the grommet 104. When installed in a window aperture, the glass of the window 102 is seated within the channel 200. In embodiments, the grommet 104 includes ridges or collars on either side of the channel 200 that hold the grommet 104 in place when the grommet 104 is seated in the window aperture. A portion of the wiper blade assembly passes through the hole of the grommet 104 when the wiper blade assembly is installed on the window 102.

Typically, vehicle windows are curved rather than completely flat for aerodynamic as well as aesthetic reasons. As can be seen in FIG. 2B, the grommet 104 can be asymmetrical in shape to conform to the curve or arc of the window 102 in which it will be installed. In these embodiments, the orientation or alignment of the grommet 104 on installation is important to correct installation of the grommet 104. The correct orientation results in a better seal and reduces the likelihood of leaks. The grommet 104 can include an orientation mark 204 on a face of the grommet 104 to indicate orientation of the grommet 104 when installed in the window 102.

Figure 3A:
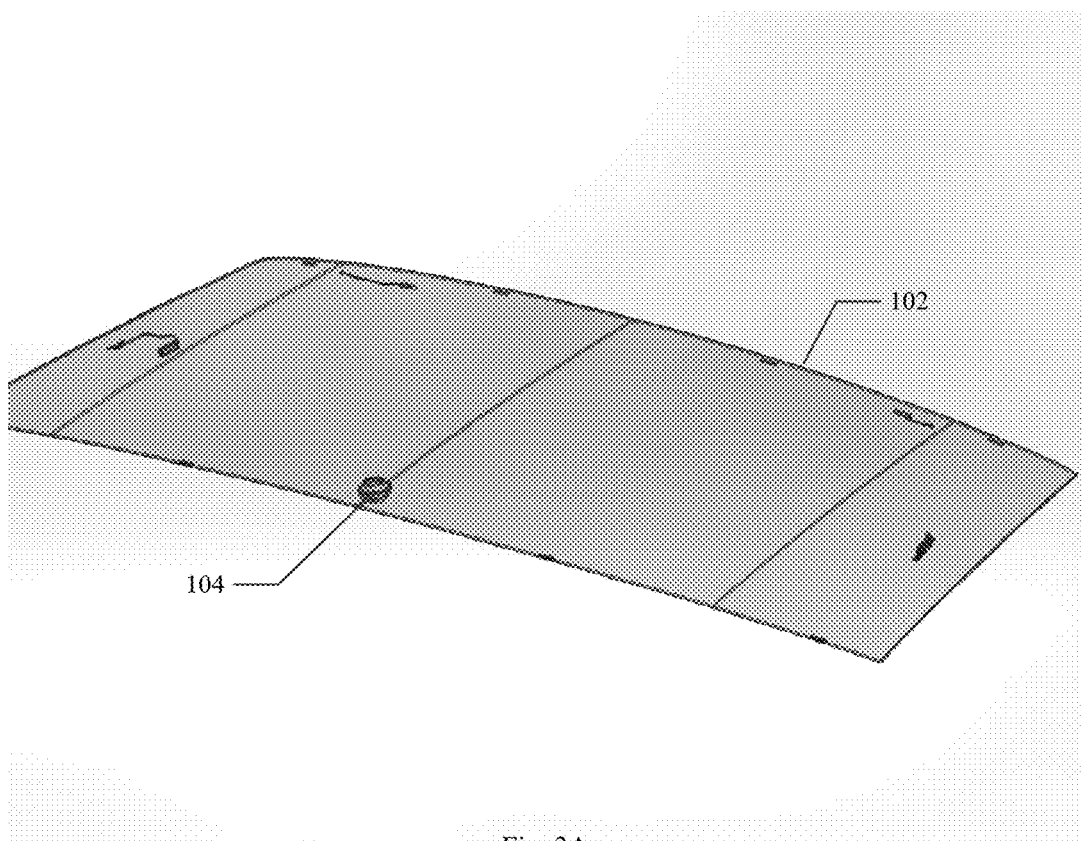
FIG. 3A is a perspective view of a grommet installed in a window.
Figure 3B:
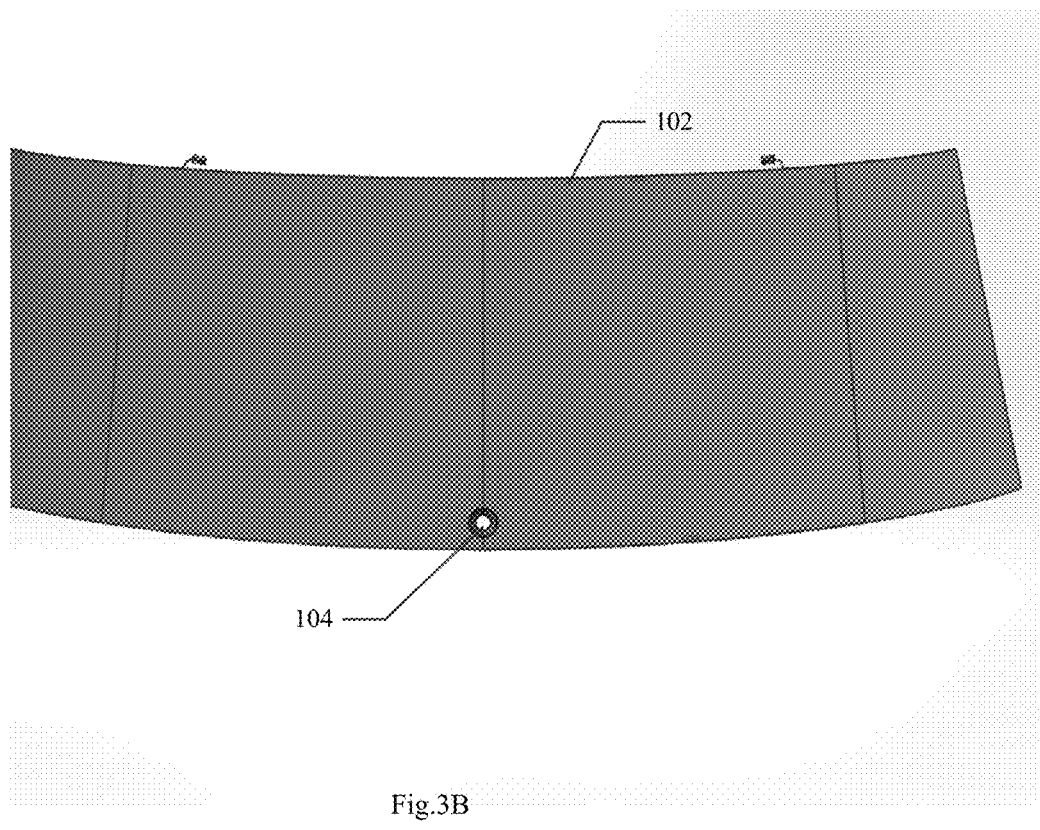
FIG. 3B is a top view of a grommet installed in a window.
Figure 3C:
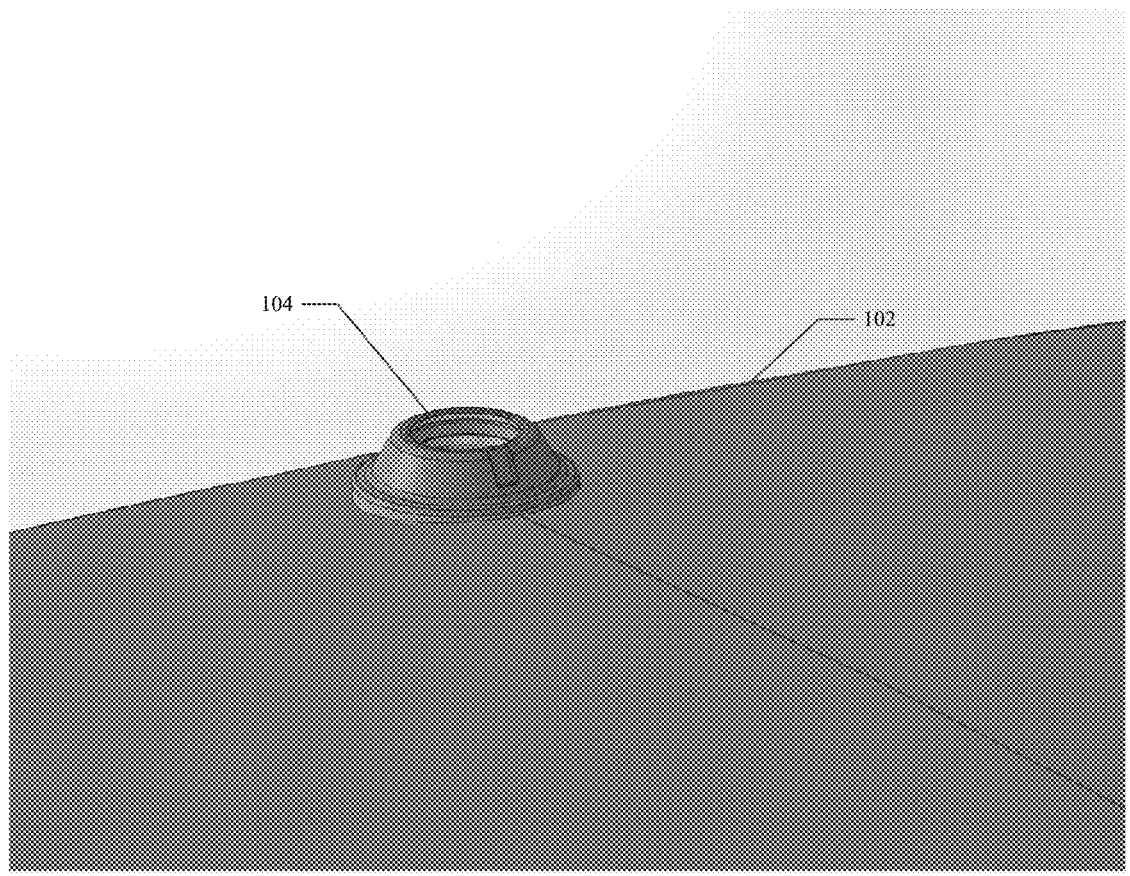
FIG. 3C is a perspective view of a grommet installed in a window.

FIGS. 3A-3C depict embodiments of a grommet 104 installed in a window 102. As shown, one face of the grommet 104 is visible on each side of the window 102, with the window 102 seated in the channel 200. FIG. 3B clearly shows the hole 202 through the grommet 104 used to mount the window wiper assembly to the grommet 104 and window 102. FIG. 3C depicts the curve of the window 102 with an installed grommet 104 and the orientation mark 204.

Figure 4:
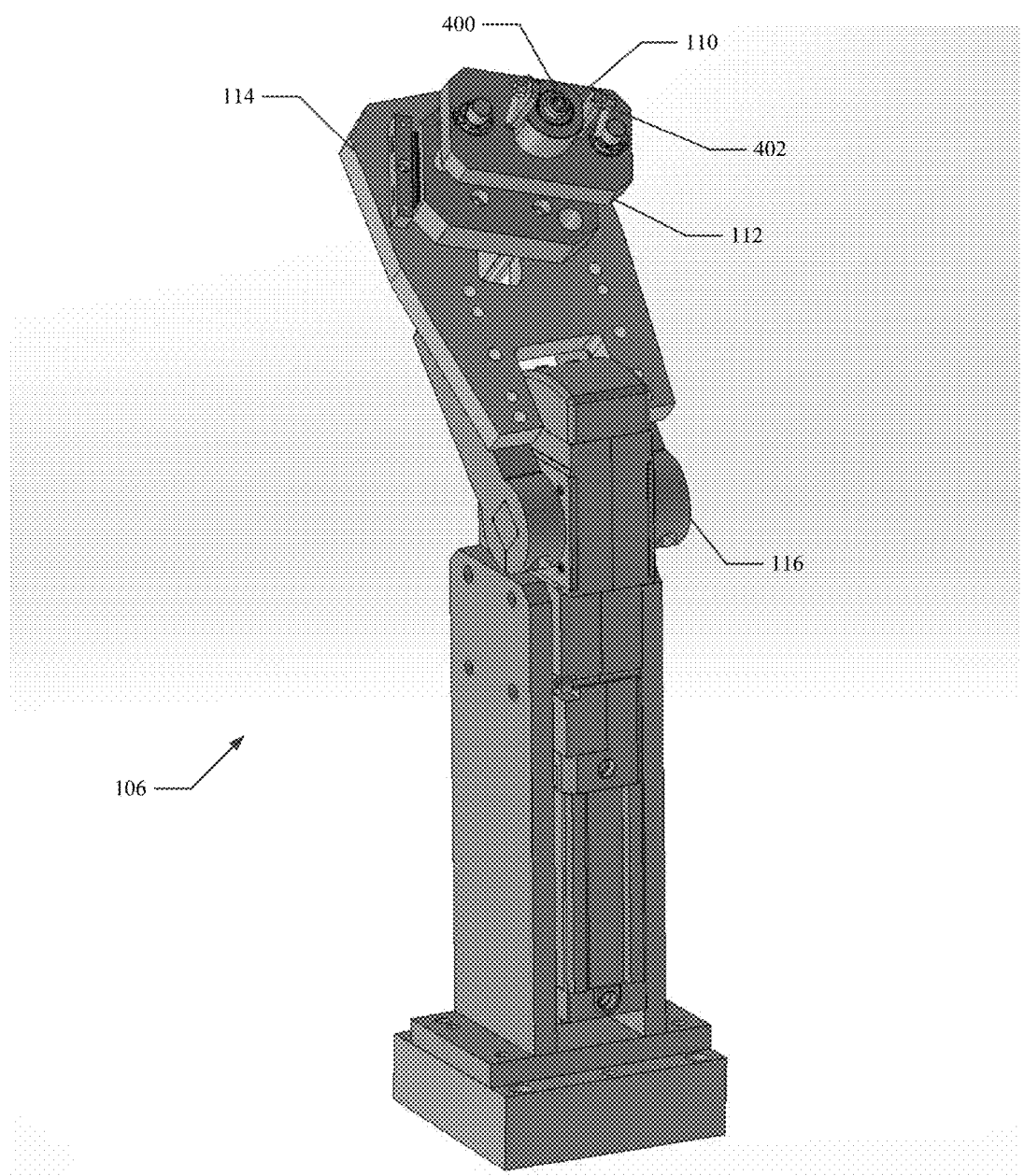
FIG. 4 is a perspective view of an embodiment of the positioner

Referring now to FIG. 4, an embodiment of the positioner 106 is depicted. As shown, the positioner 106 is in the loading position, where the positioner arm 116 is angled to allow an operator to easily place a grommet 104 in or on the holder 110 in preparation for installing the grommet 104 in the window 102. As shown, the holder 110 can include a pin 400, sized or shaped to fit within the hole 202 of the grommet 104. Frictional forces can hold the grommet 104 on the pin 400 in the orientation in which the grommet 104 is placed on the pin 400. In other embodiments, the holder 110 is implemented as a nest, cylinder, or other configuration that holds the grommet 104 in place. Any suitable method of holding the grommet 104 can be utilized. In the illustrated embodiment, the holder 110 can include a vision-based orientation system 402, described in greater detail below with respect to FIGS. 7A and 7B.

Figure 5A:
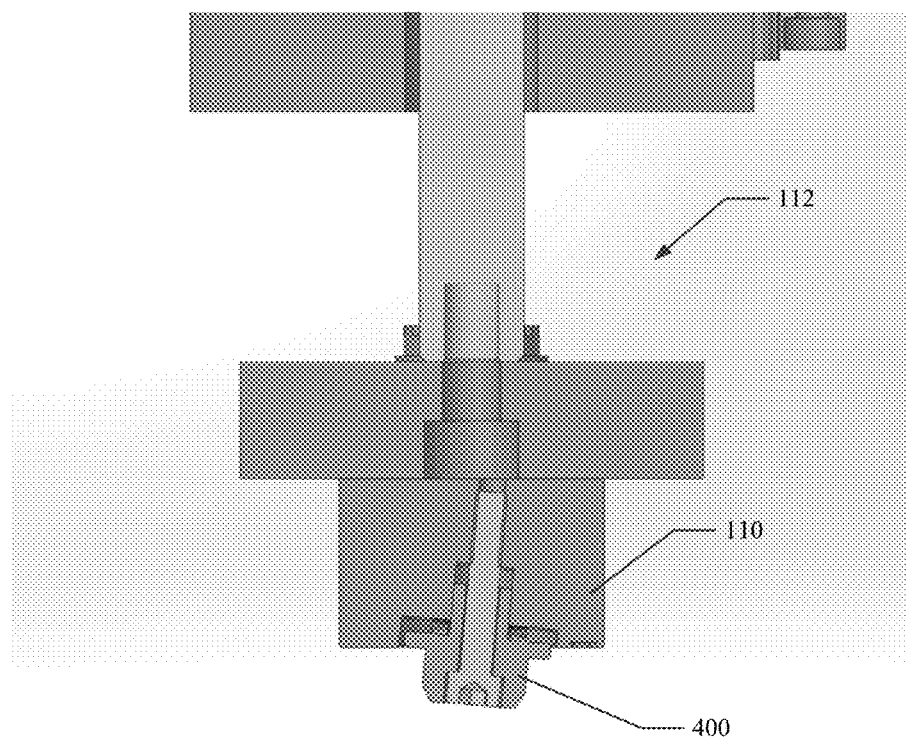
FIG. 5A is a cross-section of an embodiment of the holder and holder base.
Figure 5B:
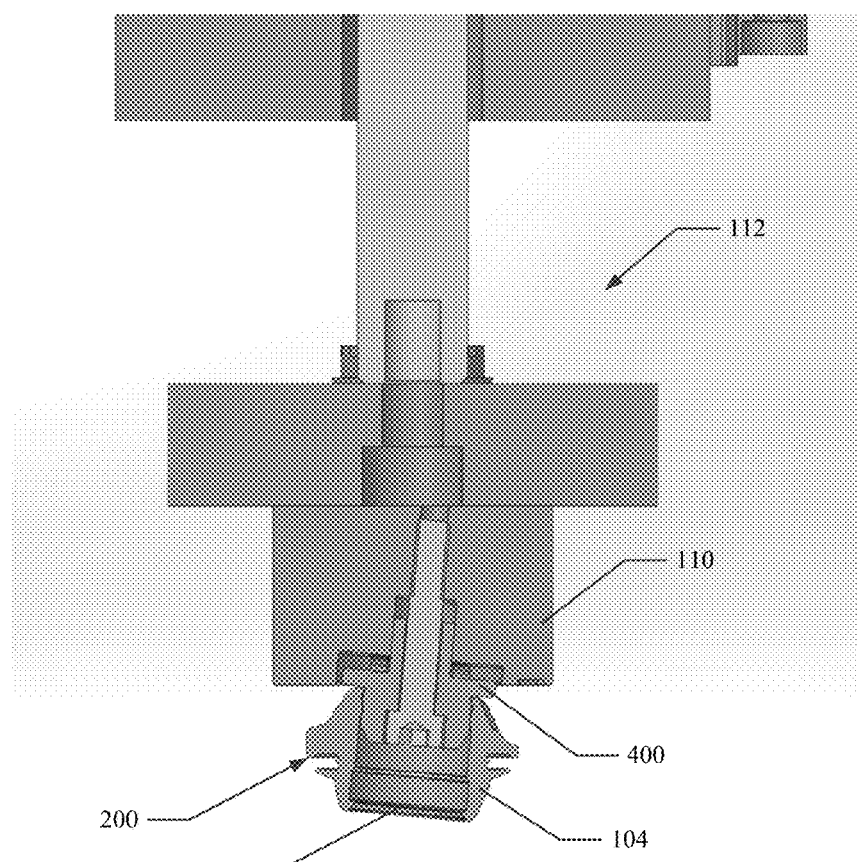
FIG. 5B is a cross-section of an embodiment of the holder and holder base with a grommet.

FIG. 5A depicts an embodiment of the holder 110 and holder base 112, while FIG. 5B depicts the embodiment of the holder 110 and holder base 112 with a grommet 104 in position for installation. Both FIGS. 5A and 5B are shown in cross-section. Here, the holder 110 includes a pin 400, sized to receive the grommet 104. In embodiments, the pin 400 is replaceable and can be swapped out so that the installer 100 can be used with multiple grommet types and sizes. Here a connector can be detached, the pin 400 removed and another pin 400, sized or shaped for a different grommet 104, can be connected and used as part of the holder 110. In other embodiments, the length of the holder base 112 can be adjusted to provide for varying thicknesses in the window class. If the holder base 112 is too short, the holder 110 will not properly position the grommet 104 adjacent to the window 102 and the installer 100 may not install the grommet 104 successfully. If the holder base 112 is too long, the holder 110 will cause the grommet 104 to hit the window 102 during installation and could damage the window 102. In embodiments, in preparation for installing grommets in a particular model of window, the pin 400 and holder base 112 can be customized for smooth operation of the installer 100.

Figure 6A:
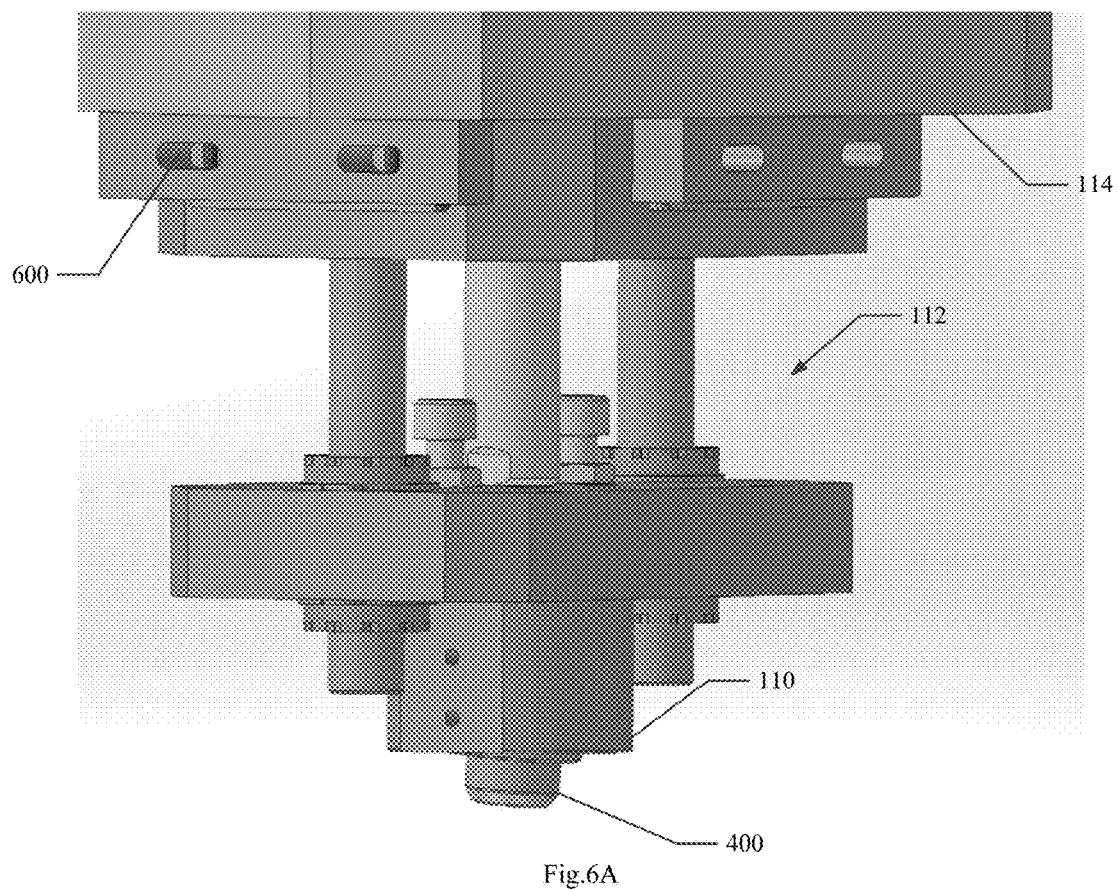
FIG. 6A is a cross-section of an embodiment of the holder and holder base.
Figure 6B:
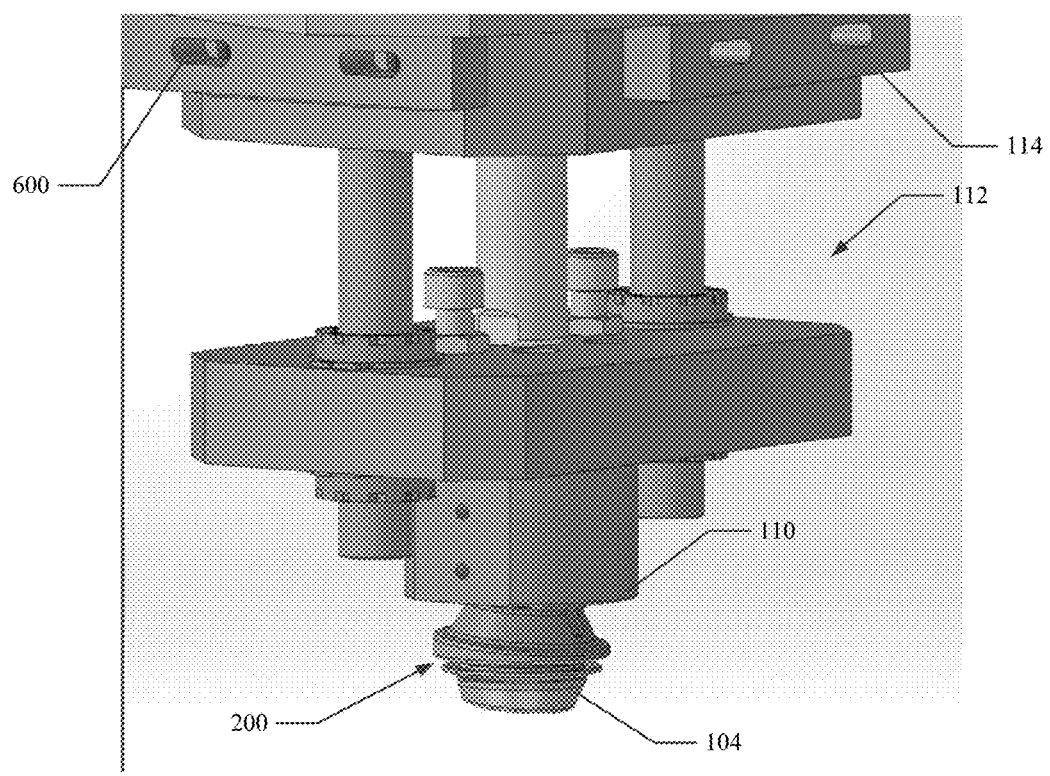
FIG. 6B is a cross-section of an embodiment of the holder and holder base with a grommet.

FIG. 6A is a perspective view of embodiments of the holder 110, holder base 112, and positioner platform 114, while FIG. 6B includes the grommet 104 placed on the pin 400. Here, slides 600 allow for lateral movement of the holder base 112 on the positioner platform 114. The ability to adjust the position of the holder base 112 on the positioner platform 114 means the positioner 106 and installer 100 can be used with a variety of windows 102 with apertures of varying locations. As discussed above, in addition to lateral adjustments, the length or extension of the holder base 112 can be adjusted for the particular thickness of the glass window 102 to ensure that the grommet 104 is sufficiently close to the window aperture for installation. In embodiments, the pin 400, the position and length of the holder base 112 and positioner platform 114 can all be adjusted or selected prior to operation of the installer 100 to customize the installer 100 for the particular window 102 and grommet 104 to be installed.

Figure 7A:
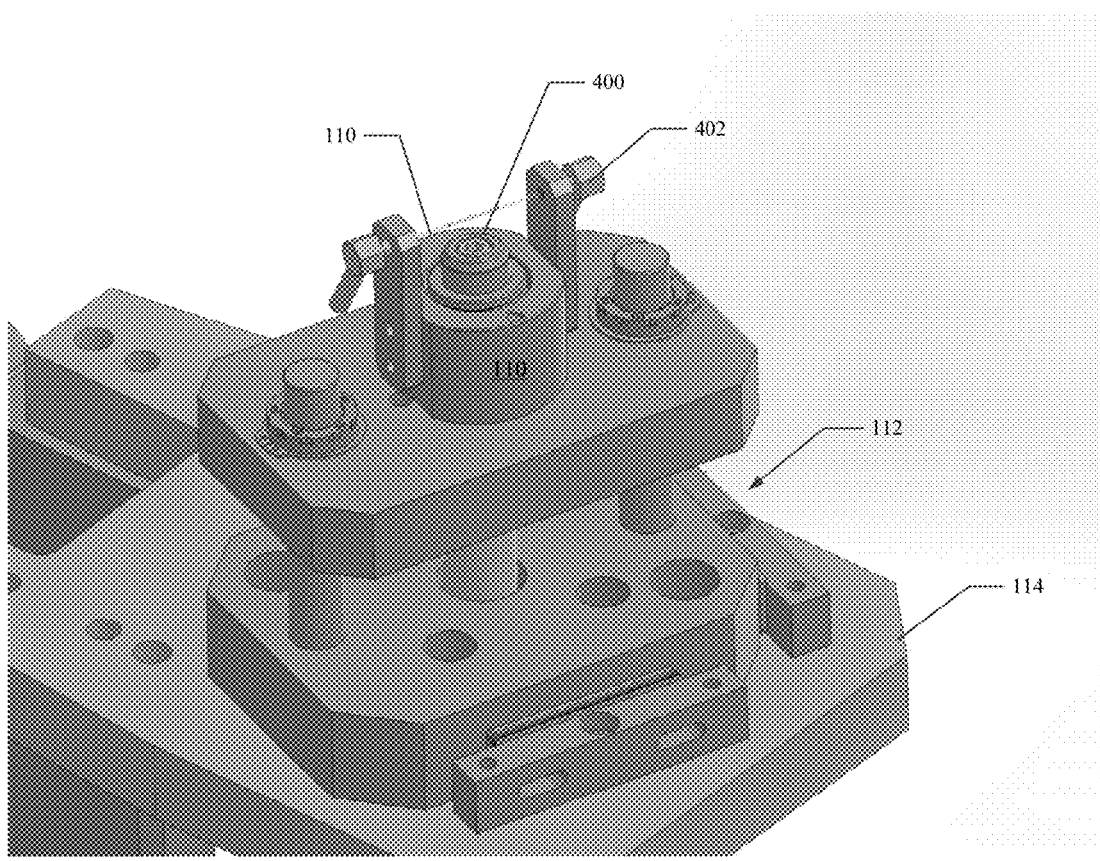
FIG. 7A is a perspective view of a holder including a vision based positioning system.
Figure 7B:
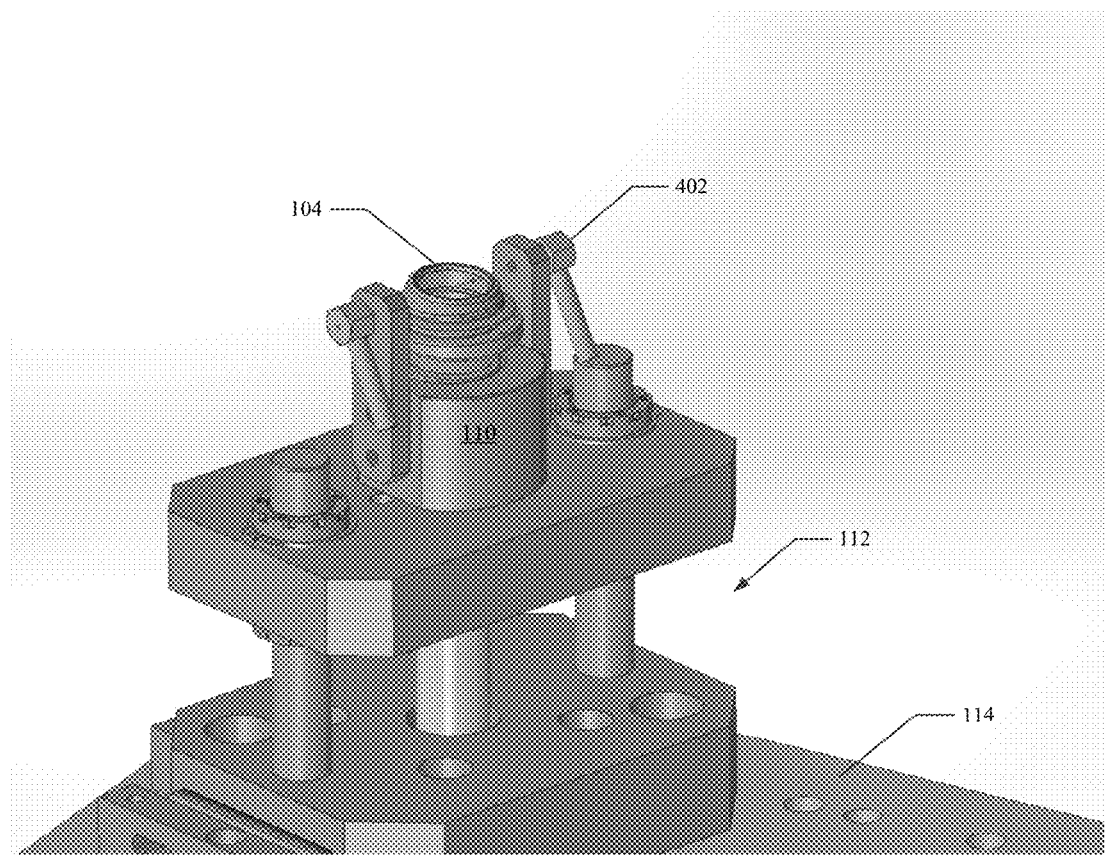
FIG. 7B is a perspective view of a holder including a vision based positioning system with a grommet in place.

FIG. 7A depicts an embodiment of the holder 110 with a vision based positioning system 402, also referred to herein as the vision system, while FIG. 7B depicts the embodiment of the holder 110 with a grommet 104 placed on the holder 110. FIG. 7A shows an orientation indicator 700 on the holder 110 that assists an operator in correctly orientating a grommet 104 when loading it on the holder 110. In an embodiment, the grommet 104 has an orientation mark 204 on its side to indicate the orientation in which the grommet 104 should be positioned for installation. In an embodiment the vision based positioning system 402 takes an image of the grommet 104 in place on the holder 110 and identifies the position of markings to determine if the orientation is correct. In other embodiments, the vision system 402 uses one or more lasers to determine if the grommet 104 is placed properly in the holder 110 using the asymmetrical geometry of the grommet 104. If the grommet 104 is not aligned properly, an indicator, such as the window assembly machine's user panel screen, will show that alignment is incorrect. In other embodiments, a simple light or audio indicator can alert the operator to the misalignment of the grommet. At that point the operator can rotate the grommet 104 or reposition it in the holder 110 to correct the orientation.

In other embodiments, the vision system 402 takes a second image of the grommet 104 once it has been installed in the window 102. If the grommet 104 has not been installed into the window 102 in the proper orientation an indicator, such as the window assembly machine's user panel screen, will show that alignment has failed. Alerting the operator to orientation errors allows the operator to quickly fix the orientation before the remainder of the wiper assembly is installed and it becomes more time consuming to correct orientation.

Figure 8A:
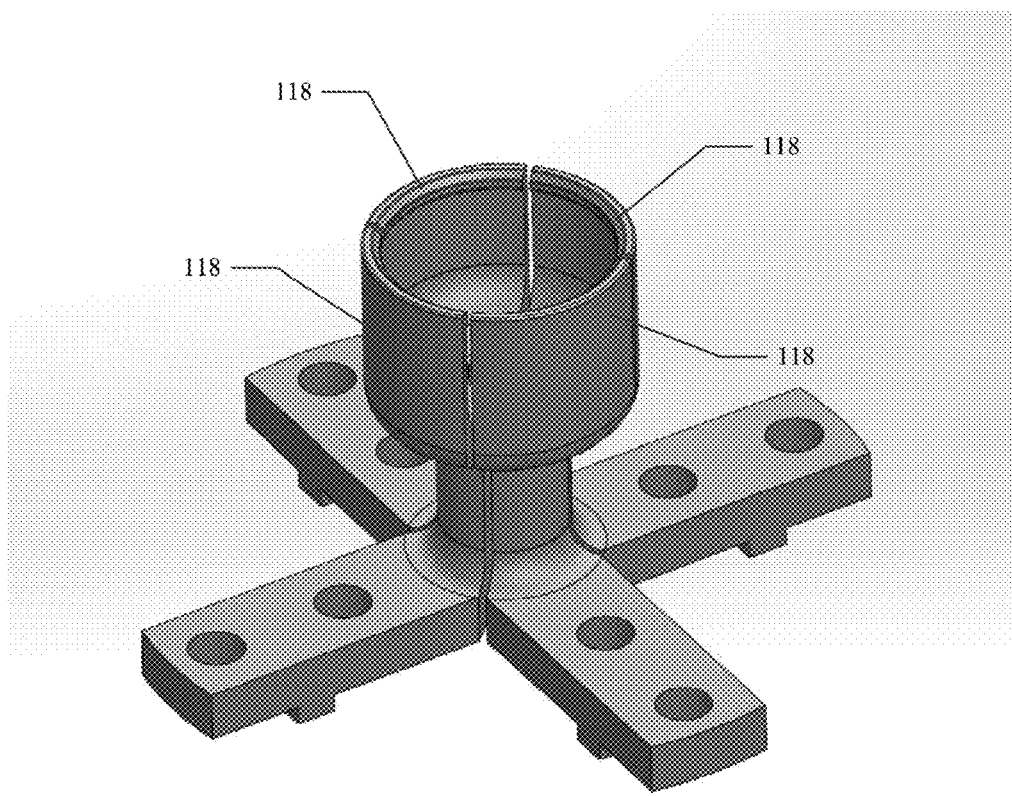
FIG. 8A is a perspective view of an embodiment of the fingers of the gripper.
Figure 8B:
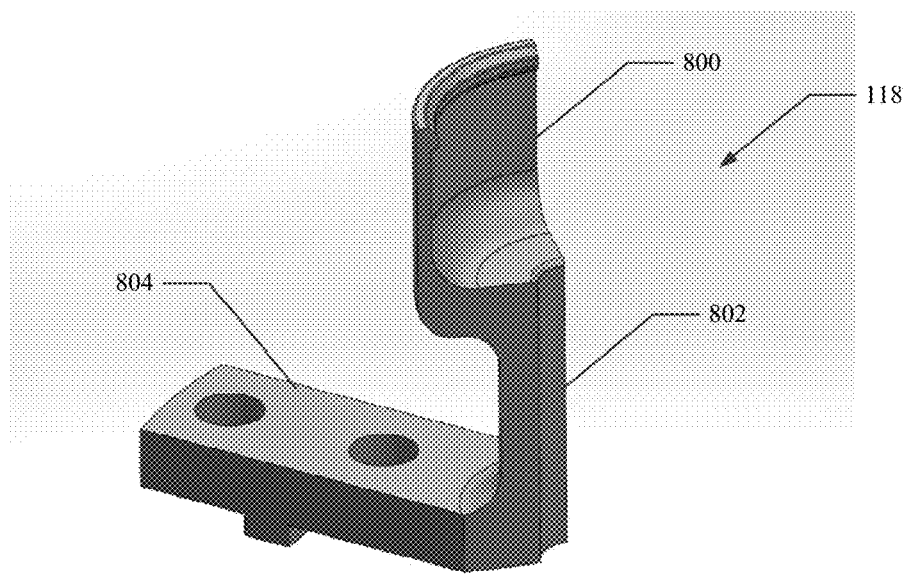
FIG. 8B is a perspective view an embodiment of a single finger of the gripper.

Referring now to FIGS. 8A and 8B, an embodiment of the fingers 118 are shown. FIG. 8B shows a single finger, including a gripping portion 800, a neck portion 802, and a connection portion 804, where the gripping portion 800 curves away from the neck portion 802 and the connection portion 804 attaches to the gripper base 120. As shown in FIG. 8A, in this embodiment when multiple fingers 118 are used together, the neck portion 802 has a smaller diameter than the gripping portion 804. This facilitates expanding the circumference of the gripping portion 800 while the neck portion 802 is inserted in the window aperture. In general, the gripper fingers 118 are sized to fit through the aperture in the window 102 when the gripper fingers 118 are in the closed position, as seen in FIG. 8A and in Fig.9A. In embodiments, once the gripping portion 800 is through the window aperture, the fingers 118 can move into the open position, shown in FIG. 9B to engage the grommet 104. Although, FIG. 8A depicts four fingers 118, which generally form a circle, other configurations and numbers of fingers 118 are possible, including, but not limited to, two, three or more fingers 118. In addition, the fingers can be any shape that allows them to be inserted through the aperture and engage the grommet 104.

Figure 9A:
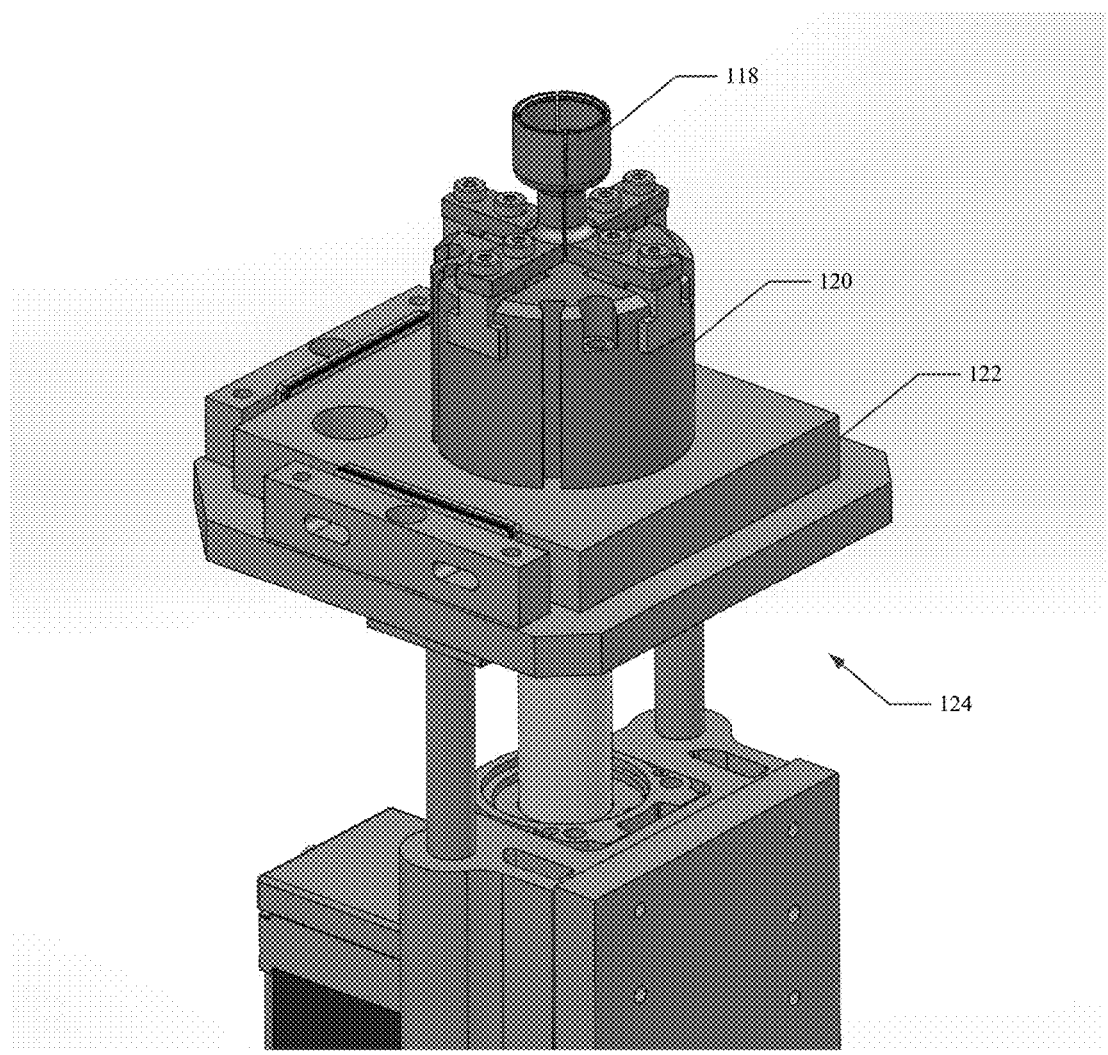
FIG. 9A is a perspective view of the gripper with fingers in the closed position.
Figure 9B:
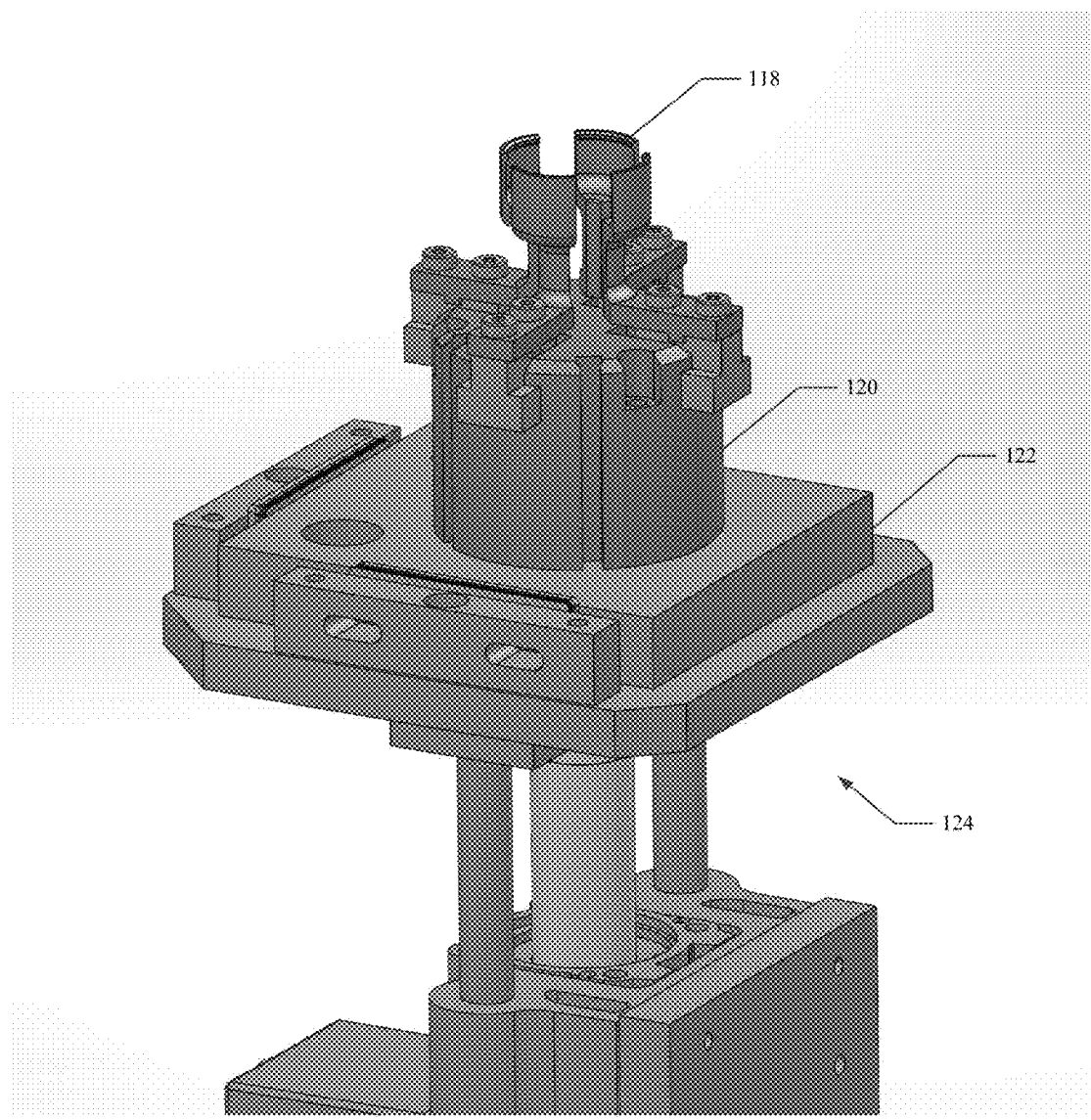
FIG. 9B is a perspective view of the gripper with fingers in the open position.

FIG. 9A depicts an embodiment of the gripper 108, including the fingers 118, the gripper base 120, the gripper platform 122 and the gripper arm 124. In the illustrated embodiment, the fingers 118 are attached to the gripper base 120 and actuators in the gripper base 120 can move the fingers 118 between the closed position shown in FIG. 9A and the open position shown in FIG. 9B. In addition, in embodiments the gripper base 120 is capable of rotating the fingers 118. This rotation allows the fingers 118 to smooth any wrinkles, or ripples in the grommet 104 that may be formed by pulling the grommet 104 through the window aperture. During this rotation, the grommet 104 is not rotated, instead it is smoothed and any deformations due to the pressure exerted during installation are eliminated.

In embodiments, the gripper platform 122 can be adjusted laterally to adapt the installer 100 for use with a variety of windows as described above with respect to the holder base 112 and the positioner platform 114. In another embodiment, the gripper platform 122 is connected to a gripper arm 108 that is capable of extending and retracting to move the fingers 118 toward and through the window aperture.

Figure 10A:
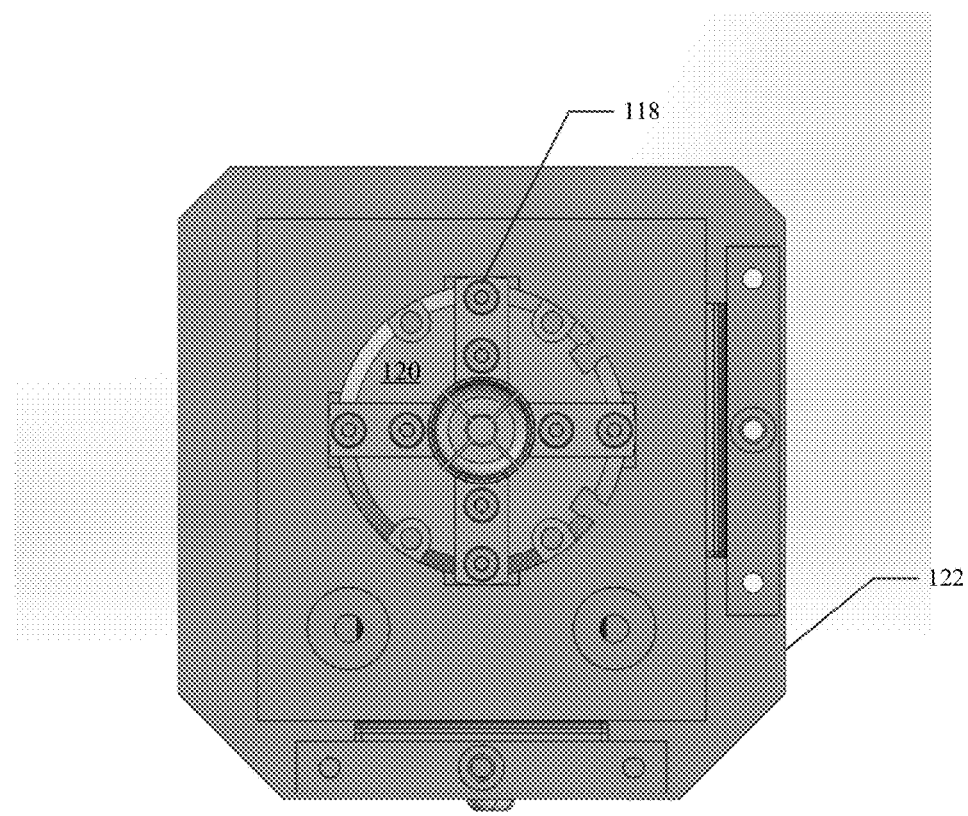
FIG. 10A is a top view of an embodiment of the gripper in the open position.
Figure 10B:
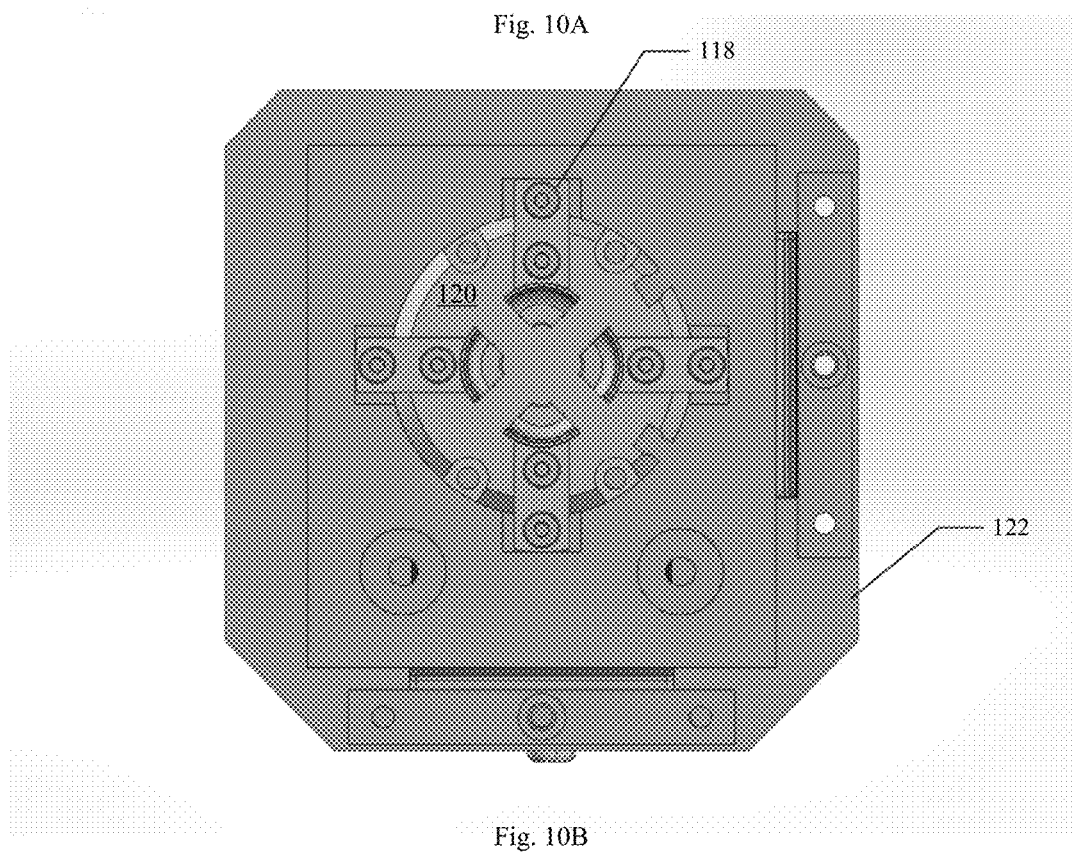
FIG. 10B is a top view of an embodiment of the gripper in the closed position.

FIGS. 10A and 10B show a top view of the fingers 118, gripper base 120 and the gripper platform 122, with the fingers 118 in the closed and open position, respectively. Actuators in the gripper base 120 are capable of moving the fingers 118 laterally, between the open and closed positions. The fingers 118 can be moved between open and closed position to engage the grommet, gripping the grommet 104 and removing it from the holder 110, then releasing the grommet 104 in the window aperture.

Figure 11:
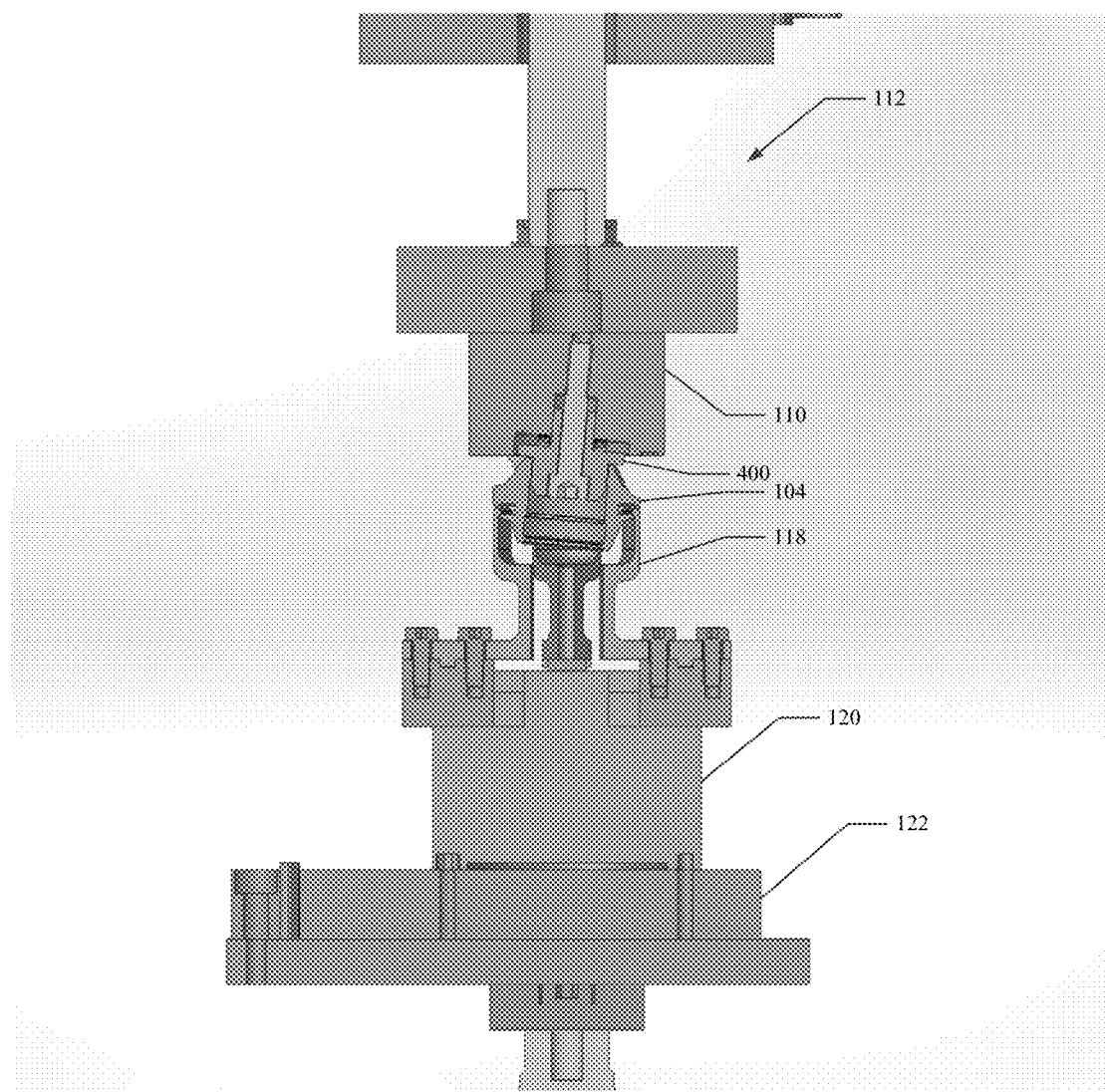
FIG. 11 is a cross-section depicting embodiments of the positioner and gripper holding a grommet.

FIG. 11 depicts embodiments of the positioner 106 and gripper 108, where the gripper 108 is about to remove the grommet 104 from the positioner. During installation, the fingers 118 would extend through the window aperture, but for clarity the window is not shown in the figure. In this embodiment, the holder 110 is depicted as a pin 400 that is sized for the hole 202 of the grommet 104. As shown here, the pin extends only partway through the hole 202, which leaves room for the fingers to engage the hole 202 of the grommet 104. In embodiments, the fingers 118 extend into the hole 202 of the grommet 104, engaging the hole 202 and drawing the grommet 104 of the pin 400 of the holder 110. The gripper base 120 is capable of moving the fingers 118 to engage the grommet 104 and pulling the grommet 104 through the window aperture without rotating the grommet 104. Consequently, the orientation of the grommet 104 from the holder 110 to the window aperture is maintained.

Figure 16A:
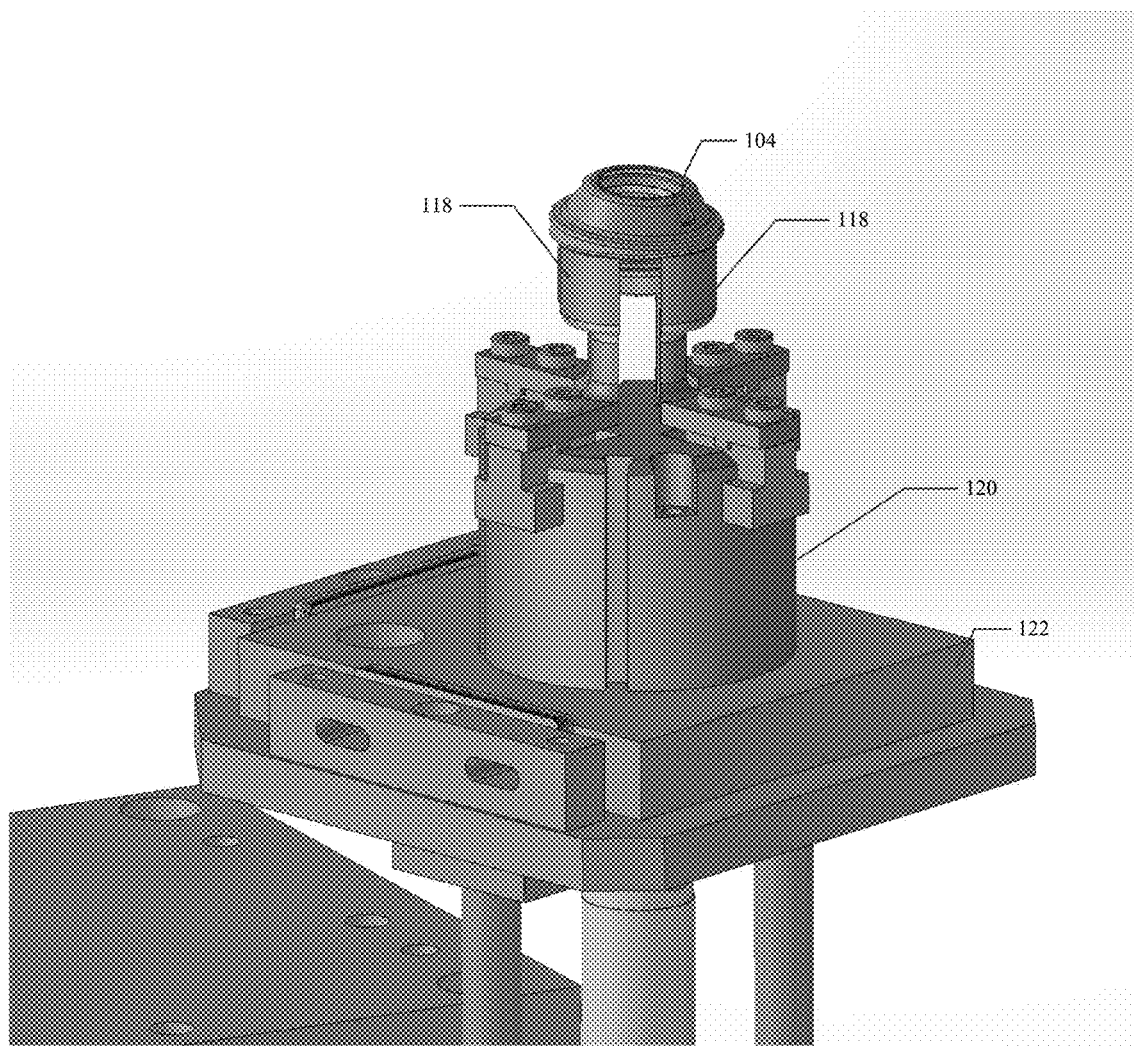
FIG. 16A is a perspective view of an embodiment of the gripper engaging a grommet
Figure 16B:
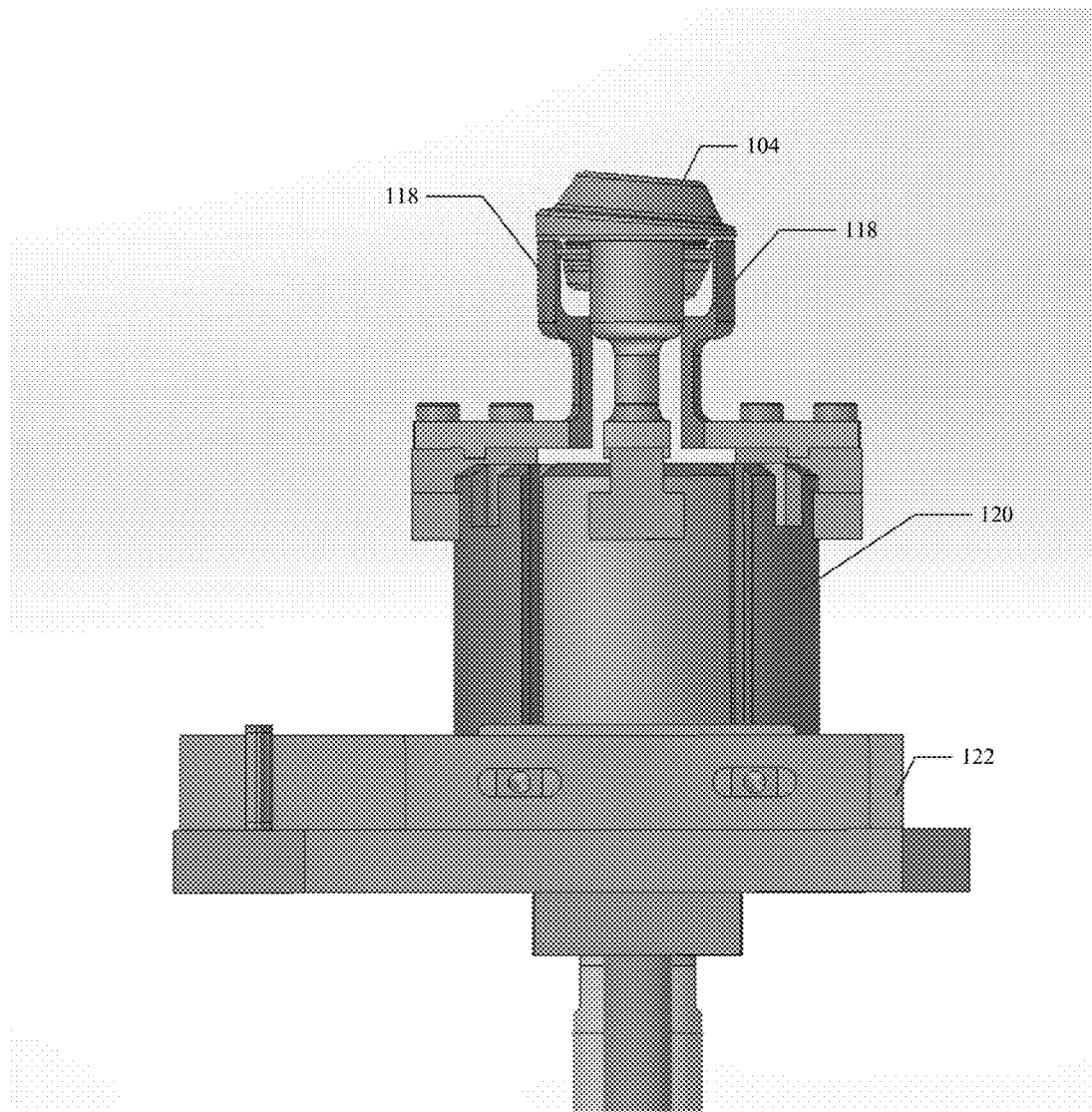
FIG. 16B is a side view of an embodiment of the gripper engaging a grommet.

Referring to FIGS. 16A and 16B, in another embodiment, the fingers 118 grasp the exterior of the grommet 104 to engage the grommet 104 and draw it off the holder 110 and into the window 102. In this embodiment, after the fingers 118 have cleared the window aperture, the diameter of the fingers is expanded over the exterior of the grommet 104. The gripping portion 800 of the fingers 118 can engage the exterior of the grommet 104 and contract until the fingers 118 with the grommet 104 retract through the window aperture. Once through the window aperture, the gripping portion 800 of the fingers can expand again, releasing the grommet 104 in the window aperture.

Figure 12:
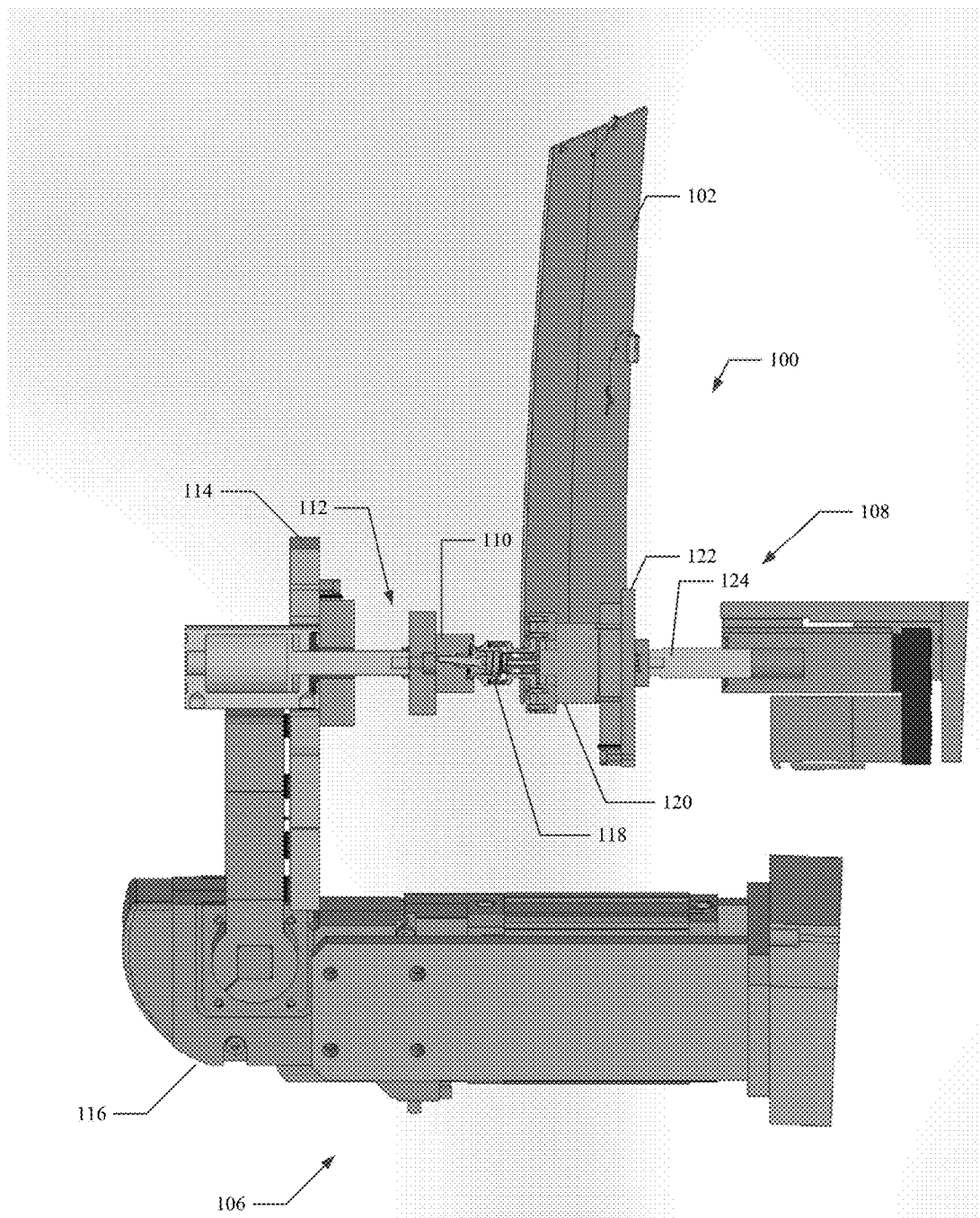
FIG. 12 is a side view of an embodiment of the installer in process of installing a grommet in a window.
Figure 13:
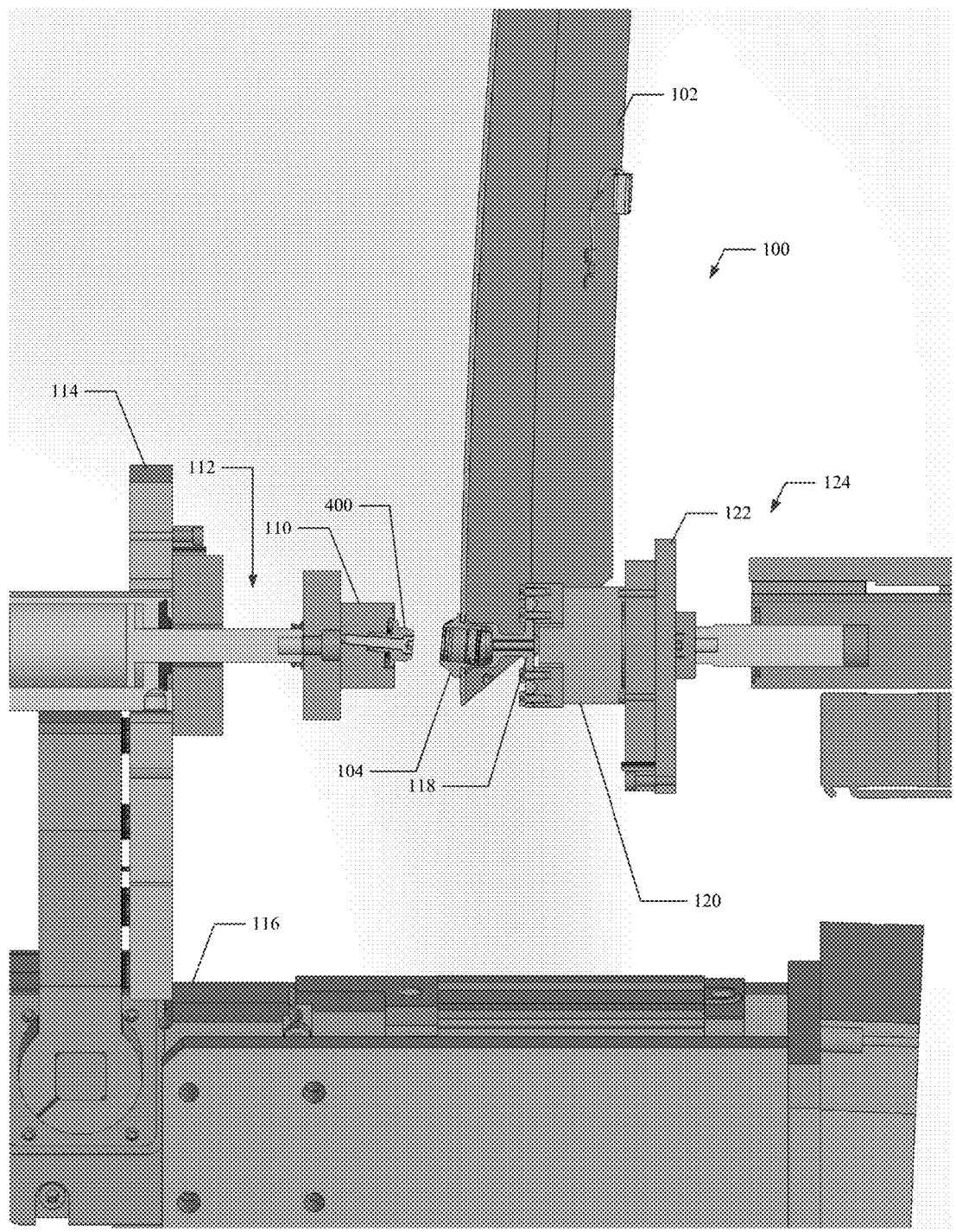
FIG. 13 is a side view of an embodiment of the installer after the grommet is removed from the holder.

FIGS. 12 and 13 depict an embodiment of the installer 100 in process of installing a grommet 104 in a window 102. In FIG. 12, the positioner arm 116 has already activated moving the grommet 104 into position proximate to or abutting the window 102. The fingers 118 extend through the window aperture and engage the grommet 104. Next, as can be seen in FIG. 13, the fingers 118 will draw the grommet 104 into the aperture until the window 102 engages the channel 200 of the grommet 104 and the grommet 104 is seated within the window aperture. The positioner arm 116 can then move or rotate to pull the holder 110 away from the window 102 and back into the loading position for the next installation. The fingers 118 can disengage from the grommet 104. In some embodiments, the fingers 118 will then smooth the interior of the grommet 104, assuring that the grommet 104 is installed in the proper orientation without wrinkles or deformation of the grommet 104.

Next, methods for installing a grommet in a window are described. While the steps are described in one order, the order of the steps can be modified, additional steps can be included and some steps can be eliminated.

Figure 14:
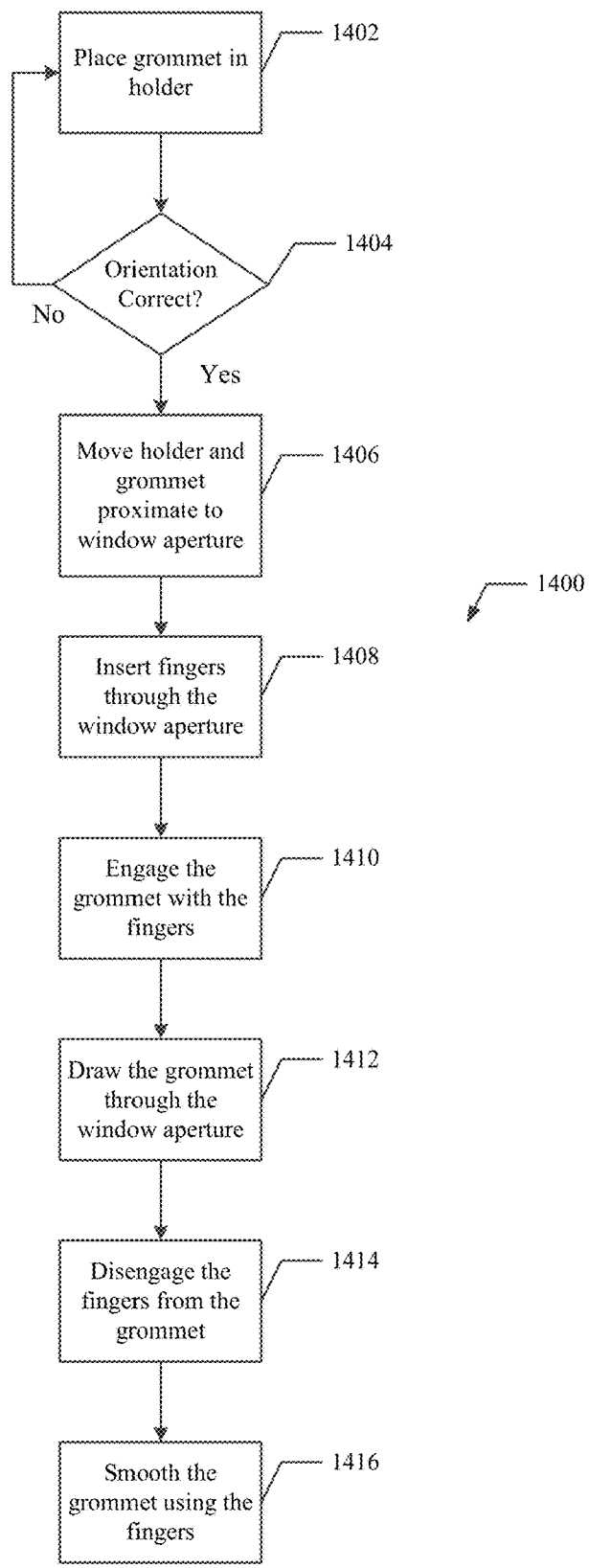
FIG. 14 is a flowchart of an embodiment of the method for installing the grommet in the window aperture.

FIG. 14 illustrates an embodiment of a method 1400 for automated installation of a grommet 104 in a window aperture. At step 1402, an operator places or loads a grommet 104 in the holder 110. In embodiments, the operator aligns an orientation mark 204 on the grommet 104 with an orientation indicator 700 on the holder 110 to ensure that the grommet 104 is properly aligned or oriented. In an embodiment, the installer 100 includes a vision based orientation system 402 that is capable of identifying when the grommet 104 is in the proper orientation for installation. In this embodiment, when the grommet 104 is placed on the holder 110 and the automated installation process is triggered, the vision system 402 checks the position and orientation of the grommet 104 at step 1404. If the grommet 104 is not oriented correctly, the misalignment triggers a signal to the orientation indicator and the operator repositions the grommet 104. The indicator can be a light or message on the installer 100 or on the associated window assembly machine that alerts the operator that there is an error. The indication can continue or remain lit until the grommet 104 is properly oriented in the holder 110. In embodiments, the installer 100 will not install the grommet 104 in the window aperture until the grommet 104 is correctly oriented in the holder 110.

Once the grommet 104 is properly oriented, the installer 100 proceeds with the installation. At step 1406 the positioner arm 116 is moved or rotated from the loading position to the installation position. In the loading position, the holder 110 is distal from the window 102 and holder 110 may be facing upward to allow the operator to easily place the grommet 104 on or in the holder 110. An actuator can drive the positioner arm 116 to move the positioner arm 116 between the loading position and the installation position. As described in more detail with respect to FIG. 15, a controller can be programmed with the instructions to control the movement of the positioner arm 116 and can be programmed for the geometry of the window assembly machine as well as the particular window in which the grommet 104 is to be installed.

After the grommet 104 is positioned proximate to, or abutting the window 102, the gripper 108 begins the process of pulling the grommet 104 through the window aperture. At step 1408 the fingers 118 are moved to the closed position, if they are not already in the closed position, and the gripper arm 124 extends the fingers 118 through the window aperture. In embodiments, the gripper arm 124 moves the gripper platform 122 and gripper base 120 longitudinally toward the window 102, which pushes the fingers 118 through the window aperture.

In embodiments, the fingers 118 move through the aperture and into the hole 202 in the grommet 104. The gripper base 120 actuators then activate to move the fingers 118 into an open position, radially expanding the gripping portion of the fingers 118 until they engage the grommet 104 at step 1410. The gripper arm 124 then retracts with the fingers 118 at least partially open, pulling the grommet 104 into the window aperture at step 1412. In embodiments, when the grommet 104 is pulled by the fingers 118 into the installed position, the gripper base 120 moves the fingers 118 into the closed position, and releases the grommet 104 in the window aperture at step 1414. In other embodiments, the fingers 118 open and engage the exterior of the grommet 104, compress the grommet 104 to pull it into position in the window aperture, and release the grommet 104 when the grommet 104 is seated in the window aperture.

In embodiments, at step 1416 after positioning the grommet 104 in the window aperture, the installer 100 can smooth the grommet 104 to remove any wrinkles or deformations caused by pulling the grommet 104 into the window aperture. Here the gripper base 120 once again opens the fingers 118, but not so far that the fingers 118 fully engage the grommet 104 or so that they would cause the grommet 104 to rotate when the fingers 118 rotate. This smoothing position is in between the open position that engages the grommet 104, and the closed position, where the fingers 118 are retracted. Once the fingers 118 are extended into the smoothing position, the fingers 118 are rotated. This smoothing is unlikely to require a 360 degree rotation of the fingers 118. In embodiments, when the fingers 118 are in the smoothing position, there are gaps between the fingers 118. The rotation can move the fingers 118 to cover the gaps and smooth the entirety of the circumference of the grommet hole 202. Once the smoothing is completed, the fingers 118 can be moved to the closed position and the gripper arm 124 can retract, removing the fingers 118 from the grommet 104 and window aperture and leaving the grommet 104 installed in the window 102.

Figure 15:
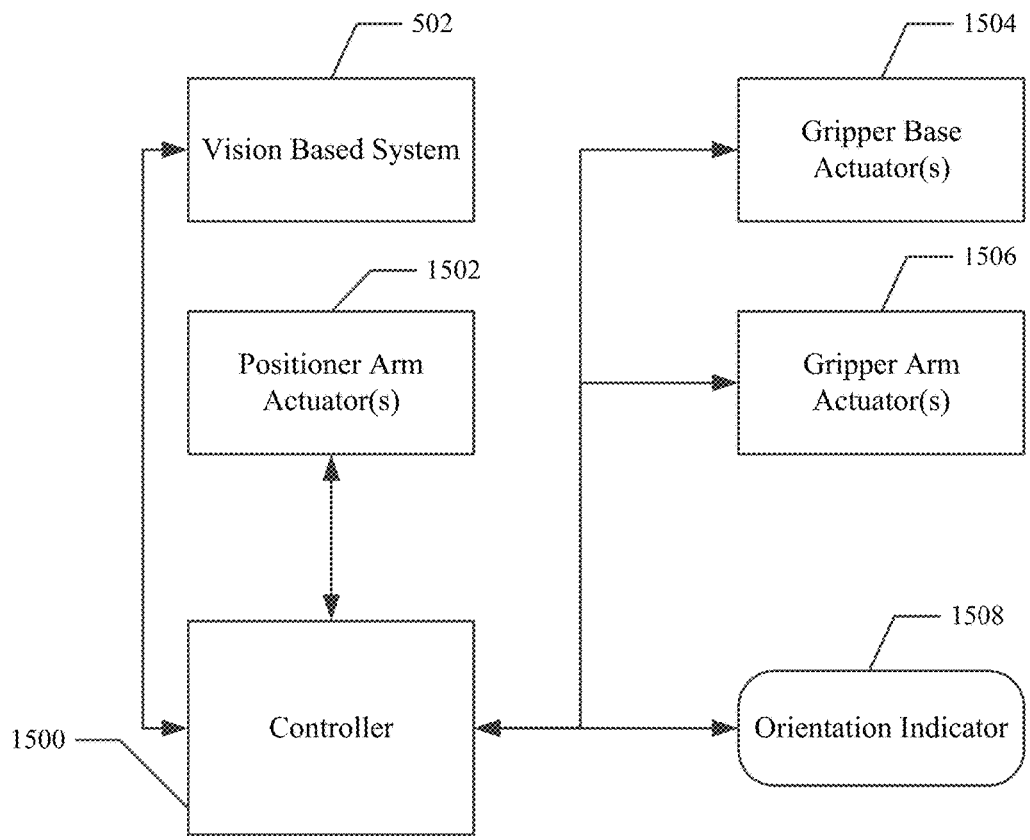
FIG. 15 is a block diagram of an embodiment of the control system for the installer.

Turning now to FIG. 15, a block diagram of the control system for the installer 100 is depicted. The system includes a controller 1500, which can be a computer, PC, or any combination of firmware and software. The controller 1500 can be programmed to direct the mechanical components of the installer 100, implementing the methods described herein. In addition, the controller 1500 can be programmed to customize the installer 100 for a variety of grommets and windows. The controller 1500 can adapt the movements of the positioner 106 and gripper 108 for the geometries of different windows, apertures and grommets 104. The controller 1500 can communicate with the vision system 402, receiving signals that identify when the grommet 104 is loaded in the holder 110 and/or if the grommet 104 is in the correct orientation. The controller 1500 can direct an indicator to alert the operator if the orientation is incorrect. In addition, the controller can prevent the installer 100 from proceeding with installation until the grommet 104 is properly oriented.

In an embodiment, the controller 1500 includes a user interface that allows an operator to control the installer 100. For example, the user interface can include a simple button or switch to activate the installer, directing it to insert the grommet 104 into the window. In other embodiments, the controller 1500 communicates with or is a part of the controls of the window assembly machine, including a user panel capable of indicating errors and potentially allowing the operator to program the installer 100 for different windows, entering window 102 and grommet 104 dimensions and geometries.

Once the grommet 104 is properly positioned in the holder 110, the controller 1500 can activate the positioner arm 116 to move the arm between the loading position and installation position. Controller 1500 can control one or more positioner arm actuators 1502 that drive the positioner arm 106, moving the holder 110 with the grommet 104 up to the window 102.

The controller 1500 can also communicate and control the gripper 108 to reach through the window 102 to engage the grommet 104. In embodiments, the controller 1500 activates the gripper base actuators 1504, moving the fingers 118 between the closed, open and smoothing positions. The controller 1500 can also direct the rotation of the fingers 118 for smoothing action via the gripper base actuators 1504. Finally, the controller 1500 can direct the gripper arm actuator 1506 to extend the gripper arm 124, effectively moving the fingers 118 through the window aperture to engage the grommet 104 and pull it into place in the window aperture. In embodiments, the controller 1500 is programmed to control the various actuators and drivers to perform the steps of the installation methods described herein.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

The invention claimed is:

1. A device for installing a grommet in a window aperture, the device comprising:
a holder configured to support the grommet;
a positioner arm that supports the holder and is configured to move the grommet into position for installation in the window aperture;
a gripper configured to extend through the window aperture, engage the grommet in the grommet holder and retract to pull the grommet from the grommet holder into the window aperture; and
a controller programmed to direct movement of the positioner arm and the gripper.

2. The device of claim 1, wherein the gripper comprises one or more fingers configured to insert through the window aperture and a hole in the grommet, wherein the fingers expand radially to engage the grommet.

3. The device of claim 2, wherein the fingers are configured to rotate and smooth the grommet after installation of the grommet in the window aperture.

4. The device of claim 1, further comprising a vision system that monitors grommet orientation on the holder.

5. The device of claim 4, wherein the vision system is configured to create and analyze an image of the grommet as supported by the holder to evaluate orientation of the grommet relative to the holder.

6. The device of claim 4, wherein the vision system includes a laser.

7. The device of claim 4, wherein the vision system generates an alert when the grommet is oriented incorrectly.

8. The device of claim 1, wherein the grommet holder comprises a pin configured to fit within a hole in the grommet and secures the grommet to the holder.

9. The device of claim 1, wherein the pin is replaceable to support grommets of different dimensions.

10. The device of claim 1, wherein the gripper includes one or more fingers that expand radially to engage the grommet.

11. The device of claim 1, wherein the positioner arm is configured to move between a loading position suitable for loading the grommet on the holder and an installation position proximate to the window to facilitate engagement by the gripper.

12. The device of claim 1, further comprising an orientation indicator on the holder, wherein when a orientation mark on the grommet is aligned with the orientation indicator, the grommet is properly positioned for installation in the window aperture.

13. The device of claim 1, wherein the controller is configurable to adapt for geometries of a variety of windows and grommets.

14. The device of claim 1, wherein the gripper includes one or more fingers that contract radially to engage the grommet.

15. A method for installing a grommet in a window aperture, the method comprising:
providing a grommet installer having a positioner configured to support the grommet and a gripper having fingers configured to draw the grommet into the window aperture;
loading the grommet on a holder supported by the positioner, the holder positioned on a first side of the window aperture;
orienting the grommet on the holder for installation in the window aperture;
moving the positioner to position the holder and grommet proximate to the window aperture;
inserting fingers through the window aperture to engage the grommet;
retracting the gripper to pull the fingers and the grommet through the aperture so that the grommet is installed within the aperture; and
disengaging the fingers from the installed grommet.

16. The method of claim 15, further comprising monitoring grommet alignment with a vision system.

17. The method of claim 15, further comprising smoothing the grommet after installing the grommet in the window aperture.

18. The method of claim 17, wherein the step of smoothing the grommet comprises:
moving the fingers proximate to the grommet without fully engaging the grommet; and
rotating the fingers.

19. The method of claim 15, further comprising providing a control panel that signals improper grommet alignment.

20. The method of claim 15, further comprising maintaining orientation of the grommet from the holder to installation in the window aperture.

* * * * *